US009864046B2

United States Patent
Anderson et al.

(10) Patent No.: US 9,864,046 B2
(45) Date of Patent: Jan. 9, 2018

(54) USING AN MM-PRINCIPLE TO ENFORCE A SPARSITY CONSTRAINT ON FAST IMAGE DATA ESTIMATION FROM LARGE IMAGE DATA SETS

(71) Applicant: Howard University, Washington, DC (US)

(72) Inventors: John M. M. Anderson, Washington, DC (US); Mandoye Ndoye, Silver Spring, MD (US); Oludotun Ode, Atlanta, GA (US); Henry C. Ogworonjo, Washington, DC (US)

(73) Assignee: Howard University, Washington, DC (US)

( * ) Notice: Subject to any disclaimer, the term of this patent is extended or adjusted under 35 U.S.C. 154(b) by 582 days.

(21) Appl. No.: 14/305,934

(22) Filed: Jun. 16, 2014

(65) Prior Publication Data

US 2016/0202346 A1    Jul. 14, 2016

Related U.S. Application Data

(60) Provisional application No. 61/835,579, filed on Jun. 15, 2013, provisional application No. 61/835,580, filed on Jun. 15, 2013.

(51) Int. Cl.
*G01S 7/292* (2006.01)
*G01S 13/88* (2006.01)
(Continued)

(52) U.S. Cl.
CPC ............ *G01S 7/292* (2013.01); *G01S 7/2923* (2013.01); *G01S 13/0209* (2013.01);
(Continued)

(58) Field of Classification Search
CPC ...... G01S 13/89; G01S 13/885; G01S 13/887; G01S 13/888; G01S 13/0209;
(Continued)

(56) References Cited

U.S. PATENT DOCUMENTS 5,070,877 A    12/1991   Mohiuddin et al.
5,135,000 A    8/1992   Akselrod et al.
(Continued)

FOREIGN PATENT DOCUMENTS

WO    2012135526    10/2012
WO    2014130566    8/2014

OTHER PUBLICATIONS

Figueiredo et al., Majorization-Minimization Algorithms for Wavelet-Based Image Restoration, Dec. 2007, IEEE Transcations on Image Processing, Vo. 16, No. 12, pp. 2980-2991.*
(Continued)

*Primary Examiner* — Peter Bythrow
*Assistant Examiner* — Daniel P Malley, Sr.
(74) *Attorney, Agent, or Firm* — Fitch Even Tabin & Flannery LLP

(57) ABSTRACT

The mathematical majorize-minimize principle is applied in various ways to process the image data to provide a more reliable image from the backscatter data using a reduced amount of memory and processing resources. A processing device processes the data set by creating an estimated image value for each voxel in the image by iteratively deriving the estimated image value through application of a majorize-minimize principle to solve a maximum a posteriori (MAP) estimation problem associated with a mathematical model of image data from the data. A prior probability density function for the unknown reflection coefficients is used to apply an assumption that a majority of the reflection coefficients are small. The described prior probability density functions
(Continued)

promote sparse solutions automatically estimated from the observed data.

44 Claims, 17 Drawing Sheets

(51) Int. Cl.
  *G01S 13/02* (2006.01)
  *G01S 13/89* (2006.01)
  *G06K 9/62* (2006.01)
  *G06K 9/00* (2006.01)

(52) U.S. Cl.
  CPC .......... *G01S 13/885* (2013.01); *G01S 13/887* (2013.01); *G01S 13/89* (2013.01); *G06K 9/6277* (2013.01); *G06K 9/00791* (2013.01)

(58) Field of Classification Search
  CPC ..... G01S 7/292; G01S 7/2923; G06T 7/0034; G06T 7/0048
  See application file for complete search history.

(56) References Cited

U.S. PATENT DOCUMENTS

| | | | |
|---|---|---|---|
| 5,732,707 | A | 3/1998 | Widder et al. |
| 5,926,568 | A * | 7/1999 | Chaney ................ G06K 9/6206 382/128 |
| 7,127,095 | B2 | 10/2006 | El Fakhri et al. |
| 7,251,306 | B2 | 7/2007 | Sauer |
| 7,295,154 | B2 | 11/2007 | Walton |
| 7,519,211 | B2 | 4/2009 | El Fakhri et al. |
| 7,804,440 | B1 | 9/2010 | Orr |
| 8,207,886 | B2 | 6/2012 | Chambers |
| 8,570,208 | B2 | 10/2013 | Sarkis |
| 2006/0022866 | A1 | 2/2006 | Walton et al. |
| 2006/0104410 | A1 | 5/2006 | Sauer et al. |
| 2006/0187305 | A1 | 8/2006 | Trivedi |
| 2008/0230703 | A1 | 9/2008 | Kadrmas et al. |
| 2009/0226064 | A1 | 9/2009 | El Fakhri et al. |
| 2010/0060509 | A1 * | 3/2010 | Chambers ................ G01S 7/411 342/22 |
| 2010/0312118 | A1 | 12/2010 | Horzewski |
| 2011/0128816 | A1 | 6/2011 | Baba et al. |
| 2011/0150309 | A1 | 6/2011 | Barfett |
| 2012/0019406 | A1 | 1/2012 | Sarkis |
| 2013/0004044 | A1 | 1/2013 | Ross |
| 2014/0016850 | A1 | 1/2014 | Anderson |
| 2014/0114650 | A1 * | 4/2014 | Hershey .............. G10L 21/0232 704/203 |
| 2014/0236004 | A1 | 8/2014 | Rognin |
| 2015/0279082 | A1 * | 10/2015 | Anderson ................ G01S 7/295 345/424 |

OTHER PUBLICATIONS

Notification of Transmittal of the International Search Report and the Written Opinion of the International Searching Authority, or the Declaration from the International Bureau of WIPO for International Application No. PCT/US14/42562 dated Mar. 18, 2015; 10 pages.
Ndoyle, M., et al.; "An MM-based Algorithm for L1-Regularized Least Squares Estimation in GPR Image Reonstruction"; IEEE Radar Conference; pp. 1-6; May 2013.
Notification of Transmittal of the International Search Report and the Written Opinion of the International Searching Authority, or the Declaration from the International Bureau of WIPO for International Application No. PCT/US2014/059062 dated Jan. 14, 2015; 11 pages.
Candes, E, et al.; "Enhancing Sparsity by Reweighted l1 Minimization"; Research paper; Oct. 2007; 28 pages.
Chen, S., et al.; "Atomic Decomposition by Basis Pursuit" ; SIAM Journal on Scientific Computing; vol. 43, No, 1, pp. 129-159; 2001.
Davis, G., et al.; "Adaptive Greedy Approximations" ; Constructive Approximation; vol. 13, No. 1; 1997; 47 pages.
De Leeuw, J., et al.; "Sharp Quadratic Majorization in One Dimension" ; Computational Statistics and Data Analysis; vol. 53, No. 1; 2009; 14 pages.
De Pierro, A.; "A Modified Expectation Maximization Algorithm for Penalized Likelihood Estimation in Emission Tomography" ; IEEE Transactions on Medical Imaging; vol. 14, No. 1, pp. 132-137; Mar. 1995.
European Patent Office Extended European Search Report dated Jul. 17, 2014 for European Application No. 12764542.2; 7 pages.
Figueiredo, M., et al.; "Wavelet-Based Image Estimation: An Empirical Bayes Approach Using Jeffrey's Noninformative Prior" ; IEEE Transactions on Image Processing; vol. 10, No. 9, pp. 1322-1331; Sep. 2001.
Hove, J., et al.; "Dual Spillover Problem in the Myocardial Septum with Nitrogen-13-Ammonia Flow Quantitation"; The Journal of Nuclear Medicine; vol. 39, pp. 591-598; Apr. 1998.
Hunter, D., et al.; "A Tutorial on MM Algorithms" ; The American Statistician; vol. 58, pp. 30-37; Feb. 2004.
Hutchins, G., et al.; "Noninvasive Quantification of Regional Blood Flow in the Human Heart Using N-13 Ammonia and Dynamic Positron Emission Tomographic Imaging"; JACC; vol. 15, No. 5, pp. 1032-1042; Apr. 1990.
Klein, R., et al.; "Kinetic model-based factor analysis of dynamic sequences for 82-rubidium cardiac positron emission tomograph"; Medical Physics; vol. 37, No. 8, pp. 3995-4010; Aug. 2010.
Metje, N., et al.; "Mapping the Underworld—State-of-the-art review" Tunnelling and Underground Space Technology; vol. 22, pp. 568-586; 2007.
Nguyen, L. et al,; "Mine Field Detection Algorithm Utilizing Data From an Ultra; Wide-Area Surveillance Radar" : Proc. SPIE 3392, Detection and Remediation Technologies for Mines and Minelike Targets III; vol. 3392, pp. 627-643; Apr. 1998.
Nguyen, L., et al.; "Supperssion of Sidelobes and Noise in Airborner SAR Imagery Using the Recursive Sidelobe Minimization Technique"; U.S. Army Research Laboratory; IEEE Radar Conference; pp. 522-525; May 2010.
Nguyen, L., et al.; "Obstacle Avoidance and Concealed Target Detection Using the Army Research Lab Ultra-Wideband Synchronous Impulse Reconstruction (UWB SIRE) Forward Imaging Radar" ; U.S. Army Research Laboratory; Proc of SPIE vol. 6553; 2007; 8 pages.
Nguyen. L., et al.; "Signal Processing Techniques for Forward Imaging Using Ultra-Wideband Synthetic Aperture Radar" ; U.S. Army Research Laboratory; Proc of SPIE vol. 5083, pp. 505-518; 2003.
Nguyen, L.; "Image Resolution Computation for Ultra-Wideband (UWB) Synchronous Impulse Reconstruction (SIRE) Radar" ; Army Research Laboratory; Sep. 2007; 26 pages.
Nguyen, L.; "Signal and Image Processing Algorithms for U.S. Army Research Laboratory Ultra-wideband (UWB) Synchronous Impulse Re-construction (SIRE) Radar" ; Army Research Lab; pp. 35-38; Apr. 2009.
Nguyen, L.; "SAR Imaging Techniques for Reduction of Sidelobes and Noise" ; Army Research Laboratory; Proc of SPIE vol. 7308; 2009; 12 pages.
Notification Concerning Transmittal of International Preliminary Report on Patentability from the International Bureau of WIPO for International Application No. PCT/US2012/031263 dated Oct. 10. 2013, 5 pages.
Notification of Transmittal of the International Search Report and the Written Opinion of the International Searching Authority, or the Declaration from the International Bureau of WIPO for International Application No. PCT/US2012/031263 dated Oct. 30, 2012; 8 pages.
Notification of Transmittal of the International Search Report and the Written Opinion of the International Searching Authority, or the Declaration from the International Bureau of WIPO for International Application No. PCT/US2014/017185 dated Jun. 10, 2014; 17 pages.

(56) References Cited

OTHER PUBLICATIONS

Potter, L., et al.; "Sparsity and Compressed Sensing in Radar Imaging"; Proceedings of the IEEE; vol. 98, No. 6, pp. 1006-1020; Jun. 2010.
Ressler, M., et al.; "The Army Research Laboratory (ARL) Synchronous Impulse Reconstruction (SIRE) Forward-Looking Radar"; Proc. of SPIE vol. 6561; 2007; 12 pages.
Schmidt, M.; "Least Squares Optimization with L1-Norm Regularization"; Project Report; Dec. 2005; 12 pages.
Tan, X., et al.; "Sparse Learning via Iterative Minimization With Application to MIMO Radar Imaging"; IEEE Transactions on Siginal Processing; vol. 59, No. 3, pp. 1088-1101; Feb. 2011.
Tibshirani, R.; "Regression Shrinkage and Selection via the Lasso"; Journal of Royal Statistical Society; Series B, vol. 58, No. 1, pp. 267-288; 1996.
Vaida, F.; "Parameter Convergence for EM and MM Algorithms"; Statistica Sinica; vol. 15, No. 3, pp. 831-840; 2005.
Van Der Merwe, A., et al.; "A Clutter Reduction Technique for GPR Data from Mine Like Targets"; Proc. SPIE vol. 3719; Aug. 1999; 12 pages.
Wu, C.; "On the Convergence Properties of the EM Algorithm"; The Annals of Statistics; vol. 11, No. 1, pp. 95-103; Mar. 1983.
Wu, T.T., et al.; "The MM Alternative to EM"; Statistical Science; vol. 25, No. 4. pp. 492-505; Apr. 2011.
Wu, Z., et al.; "An Image Reconstruction Method Using GPR Data"; IEEE Transactions on Geoscience and Remote Sensing; vol. 37, No. 1; Jan. 1999; 8 pages.
Yang, A., et al.; "Fast L1-Minimization Algorithms and an Application in Robust Face Recognition: A Review"; Technical Report No. UCB/EECS-2010-13; Feb. 2010; 14 pages.
Yang, A., et al.; "Fast l1-Minimization Algorithms for Robust Face Recognition"; IEEE Transactions on Image Processing; vol. 22, No. 8, pp. 3234-3246; Jun. 2013.

* cited by examiner

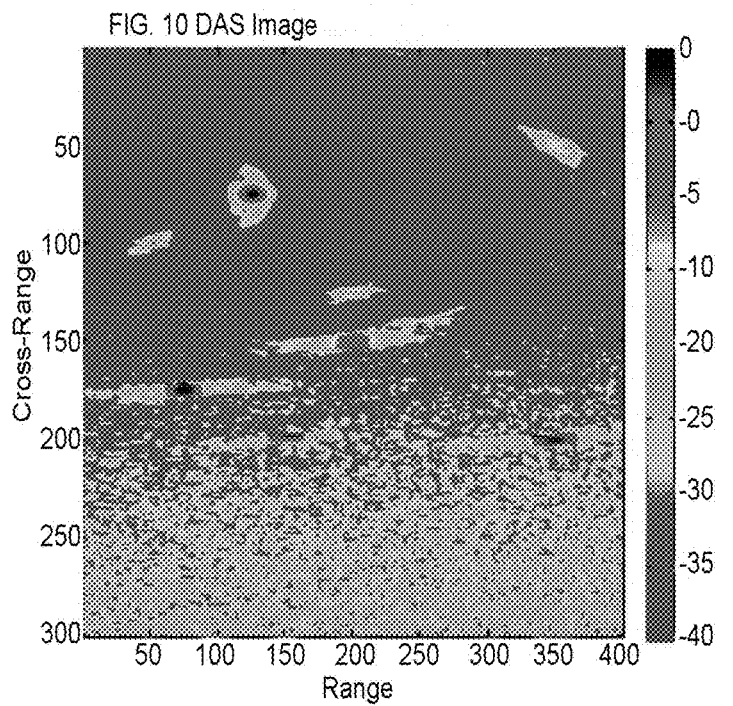
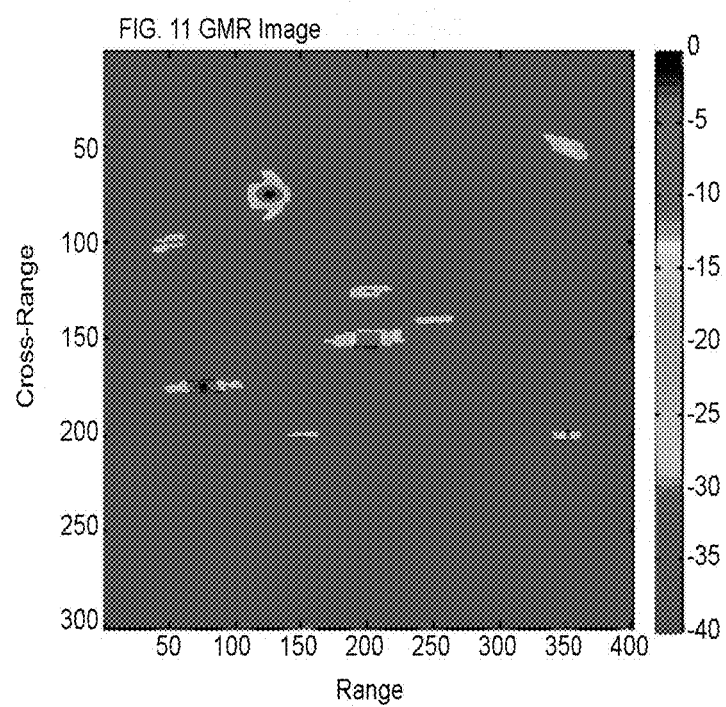

ROC curve for SNR=20B

ROC curve for SNR=20dB

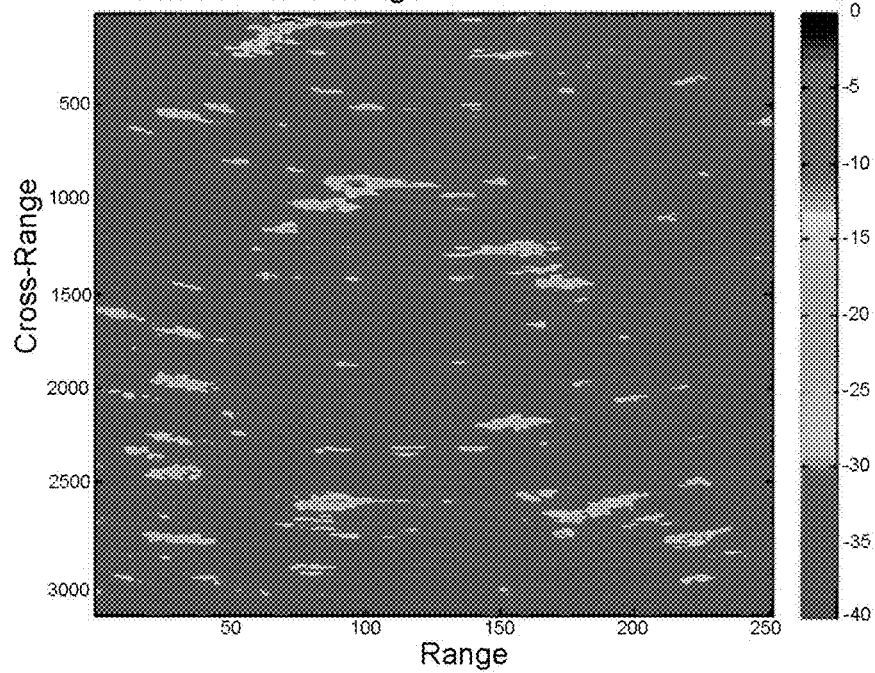
FIG. 14 DAS Image
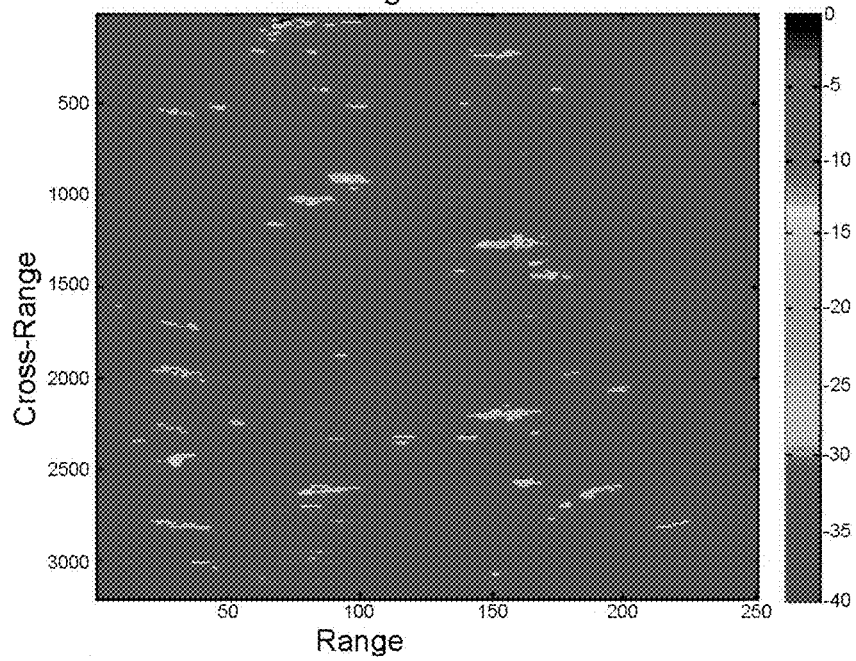
FIG. 15 GMR Image

DAS

RSM

LMM

Jeffrey

Laplacian-like

Laplacian (a) Image formed using the DAS algorithm (b) Image formed using the RSM algorithm (using 500 DAS images)

(c) Image formed using the LMM algorithm, Regularization parameter: $\lambda = 0.001$, 500 iterations (d) Image formed using the MAP-Butterworth algorithm, 500 iterations

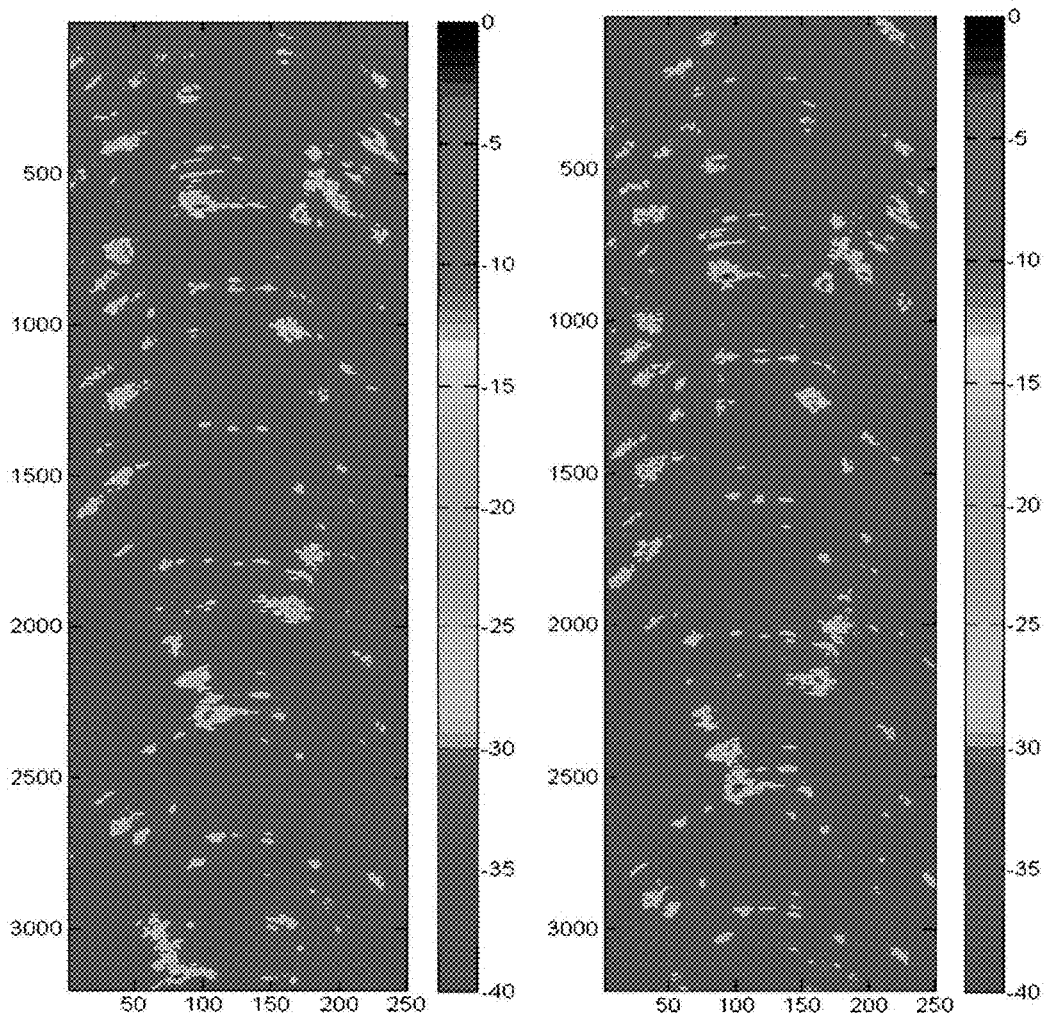
FIG. 26 DAS ALGORITHM    FIG. 27 RSM ALGORHTIM

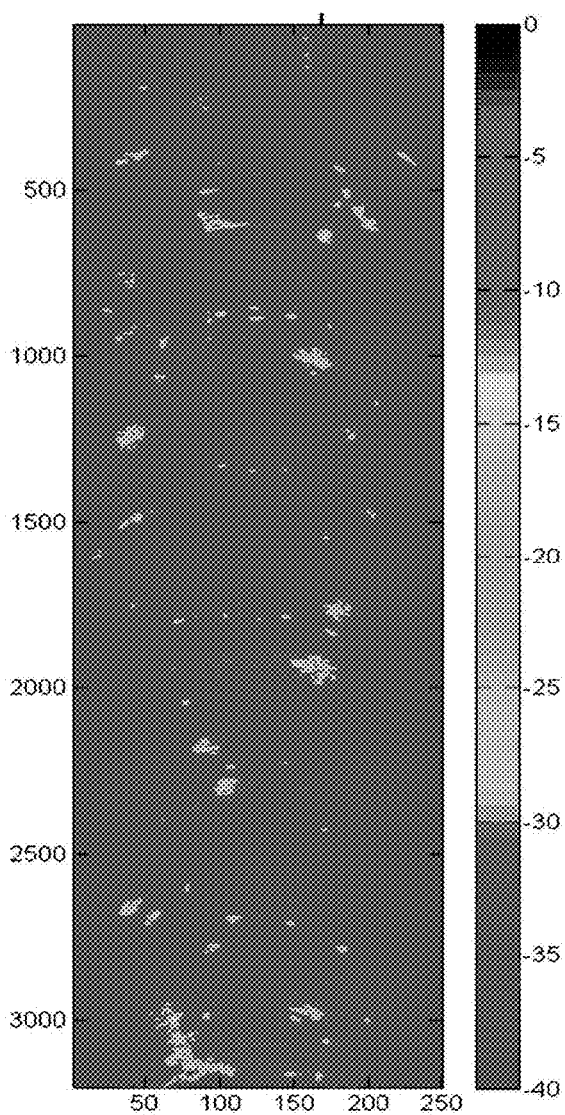
FIG. 28 LMM ALGORITHM
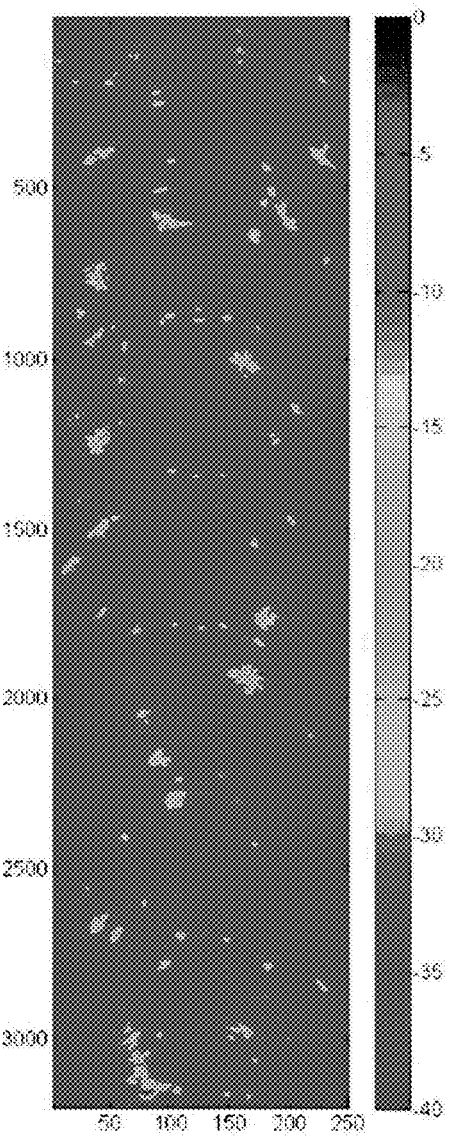
FIG. 29 BUTTERWORTH ALGORITHM

USING AN MM-PRINCIPLE TO ENFORCE A SPARSITY CONSTRAINT ON FAST IMAGE DATA ESTIMATION FROM LARGE IMAGE DATA SETS

RELATED APPLICATIONS

This application claims the benefit of U.S. Provisional application No. 61/835,579, filed Jun. 15, 2013 and U.S. Provisional application No. 61/835,580, filed Jun. 15, 2013, each of which is incorporated by reference in its entirety herein.

GOVERNMENT LICENSE RIGHTS

This invention was made with government support under contract number W911NF-1120039 awarded by US Army Research Laboratory and the Army Research Office. The government has certain rights in the invention.

FIELD OF THE INVENTION

This invention relates generally to image data processing and more specifically to applying the majorize-minimize mathematical principle to achieve fast image data estimation for large image data sets.

BACKGROUND

Half of the coalition forces casualties in the Iraq and Afghanistan wars are attributed to land mines and improvised explosive devices (IEDs). Consequently, a critical goal of the US Army is to develop robust and effective landmines/IED detection systems that are deployable in combat environments. Accordingly, there is a desire to create robust algorithms for sub-surface imaging using ground penetrating radar (GPR) data and thus facilitate higher IED detection rates and lower false alarm probabilities.

Referring to the example schematic of FIG. 1, a GPR imaging system transmits signals from an above ground transmitter 102 into the ground of a scene-of-interest (SOI) 104. Signals that are reflected off of objects 106, 108, and 110 in the SOI 104 are received by one or more receivers 112 to generate images that convey relevant information about the objects 106, 108, and 110 (also known as scatters) within the SOI 104. As a transmitted pulse propagates into a SOI 104, reflections occur whenever the pulse encounters changes in the dielectric constant ($\in_r$) of the material through which the pulse propagates. Such a transition occurs, for example, when the radar pulse moving through dirt encounters a metal object such as an IED. The strength of a reflection due to a patch of terrain can be quantified by its reflection coefficient, which is proportional to the overall change in dielectric constant within the patch.

In principle, GPR imaging is well-suited for detecting IEDs and land mines because these targets are expected to have much larger dielectric constants than their surrounding material, such as soil and rocks. It should be noted that for a high frequency transmission pulse (i.e., greater than 3 MHz), the backscattered signal of a target can be well approximated as the sum of the backscattered signals of individual elementary scatterers.

The phrase GPR image reconstruction refers to the process of sub-dividing a SOI into a grid of voxels (i.e., volume elements) and estimating the reflection coefficients of the voxels from radar-return data. Existing image formation techniques for GPR datasets include the delay-and-sum (DAS) or backprojection algorithm and the recursive sidelobe minimization (RSM) algorithm.

The DAS algorithm is probably the most commonly used image formation technique in radar applications because its implementation is straightforward. The DAS algorithm simply estimates the reflectance coefficient of a voxel by coherently adding up, across the receiver-aperture, all the backscatter contributions due to that specific voxel. Although the DAS algorithm is a fast and easy-to-implement method, it tends to produce images that suffer from large side-lobes and poor resolution. The identification of targets with relatively small radar cross section (RCS) is thus difficult from DAS images because targets with large a RCS produce large side-lobes that may obscure adjacent targets with a smaller RCS.

The RSM algorithm is an extension of the DAS algorithm that provides better noise and side-lobe reduction, but no improvement in image resolution. Moreover, results from the RSM algorithm are not always consistent. This may be attributed to the algorithm's use of randomly selected apertures or windows through which a measurement is taken. The requirement for a minimum threshold for probability detection and false alarms would make it difficult to use the RSM algorithm in practical applications.

Both the DAS and RSM algorithms fail to take advantage of valuable a-priori or known information about the scene-of-interest in a GPR context, namely sparsity. More specifically, because only a few scatterers are present in a typical scene-of-interest, in other words most of the backscatter data is zero, it is reasonable to expect better estimates of the reflectance coefficients when this a-priori sparsity assumption is incorporated into the image formation process.

Several linear regression techniques for sparse data set applications are known. Algorithms for sparse linear regression can be roughly divided into the following categories: "greedy" search heuristics, iterative re-weighted linear least squares algorithms, and linear inversion and deconvolution via $l_p$-regularized least-squares.

"Greedy" search heuristics such as projection pursuit, orthogonal matching pursuit (OMP), and the iterative deconvolution algorithm known as CLEAN comprise one category of algorithms for sparse linear regression. Although these algorithms have relatively low computational complexity, regularized least-squares methods have been found to perform better than greedy approaches for sparse reconstruction problems in many radar imaging problems. For instance, the known sparsity learning via iterative minimization (SLIM) algorithm incorporates a-priori sparsity information about the scene-of-interest and provides good results. However, its high computational cost and memory-size requirements may make it inapplicable in real-time settings.

Another known approach to sparse linear regression is the iterative re-weighted linear least-squares (IRLS), where the solution of the mathematical $l_1$-minimization problem is given by solving a sequence of re-weighted $l_2$-minimization problems. A conceptually similar approach is to compute the $l_0$-minimization by solving a sequence of re-weighted $l_1$-minimization problems.

Still another known approach to sparse linear regression are the linear inversion and deconvolution via $l_p$-regularized least-squares (LS) methods. In these methods, the reflection coefficients are estimated using $$\hat{x} = \underset{x}{\operatorname{argmin}} \|y - Ax\|_2^2 + \lambda \|x\|_p^p, \qquad (1)$$

where $\lambda$ is the regularization parameter. $l_1$-regularization (i.e., p=1) incorporates the sparsity assumptions by approximating the minimum $l_o$ problem, which is to find the most sparse vector that fits the data model. Directly solving the $l_0$-regularization problem is typically not even attempted because it is known to be non-deterministic polynomial-time hard (NP-hard), i.e., very processing intensive to solve. To date, $l_1$-regularization has been the recommended approach for sparse radar image reconstruction.

So called $l_1$-LS algorithms incorporate the sparsity assumption, generally give acceptable results, and could be made reasonably fast via speed-up techniques or parallel/distributed implementations. LS-based estimation can, however, be ineffective and biased in the presence of outliers in the data. This is a particular disadvantage, however, because in practical settings, the presence of outliers in measurements is to be expected.

More specifically, the $l_1$-LS estimation method has been known for some time, wherein the concept has been popularized in the statistics and signal processing communities as the Least Absolute Selection and Shrinkage Operator (LASSO) and Basis Pursuit denoising, respectively. A number of iterative algorithms have been introduced for solving the $l_1$-LS estimation problem. Classical approaches use linear programming or interior-point methods. However, in many real-world and large scale problems, these traditional approaches suffer from high computational cost and lack of estimation accuracy. Heuristic greedy alternatives like Orthogonal Matching Pursuit and Least Angle Regression (LARS) have also been proposed. These algorithms are also likely to fail when applied to real-world, large-scale problems. Several other types of algorithms for providing $l_1$-LS estimates exist in the literature and others continue to be proposed.

Some of the shortcomings of the DAS and RSM algorithms may be attributed to the fact that their data model does not take into consideration known prior information about SOIs. Since only a few scatterers are present in a typical SOI, better reflection coefficient estimates can be expected when the a-priori sparsity assumption is incorporated into the model. The SLIM algorithm produces good results by incorporating the assumption the SOIs are sparsely populated by scatterers. However, its high computational cost may make the SLIM algorithm impractical for large-scale real time applications. The class of $l_1$-regularized least squares ($l_1$-LS) algorithms have been recommended for radar imaging where sparse solutions are expected. This class of algorithms have been found to perform well in a number of applications, such as machine learning and neuroimaging. In off-line applications, where training data is attainable, generalized cross-validation or similar techniques can be used to obtain optimal or near-optimal regularization parameter. However, in real-time on-line applications such as GPR imaging, there is no straightforward way to choose an appropriate regularization parameter. It may therefore be difficult to effectively take advantage of $l_1$-LS algorithms in GPR imaging problems or other real-time applications.

SUMMARY

Generally speaking and pursuant to these various embodiments, the mathematical majorize-minimize principle is applied in various ways to process the image data to provide a more reliable image from the backscatter data using a reduced amount of memory and processing resources. In one approach, a processing device processes the data set by creating an estimated image value for each voxel in the image by iteratively deriving the estimated image value through application of a majorize-minimize principle to solve a maximum a posteriori (MAP) estimation problem associated with a mathematical model of image data from the data. As part of this approach, a prior probability density function for the unknown reflection coefficients is used to apply an assumption that a majority of the reflection coefficients are small. The prior probability density function used to apply an assumption that a majority of the reflection coefficients are small can be applied in a variety of ways. So configured, the described approaches produce sparse images with significantly suppressed background noise and sidelobes. The described prior probability density functions promote sparse solutions automatically estimated from the observed data.

The application of the majorize-minimize principle can be further optimized for the GPR context by accounting for a symmetric nature of a given radar pulse, accounting for similar discrete time delays between transmission of a given radar pulse and reception of reflections from the given radar pulse, and accounting for a short duration of the given radar pulse. Application of these assumptions results in a relatively straight forward algorithm that can produce higher quality images while using reduced memory and processing resources.

Accordingly, the above methods use the particularized data collected using transmitters and receivers to output images representing objects in a SOI. Devices, including various computer readable media, incorporating these methods then provide for display of image data using reduced processing and memory resources and at increased speed as processed according to these techniques.

These and other benefits may become clearer upon making a thorough review and study of the following detailed description.

BRIEF DESCRIPTION OF THE DRAWINGS

The above needs are at least partially met through provision of the methods and apparatuses for receiving and processing image data as described in the following detailed description, particularly when studied in conjunction with the drawings, wherein:

FIG. 10 comprises a displayed image derived from the data of FIG. 9 using a prior art DAS method;

FIG. 11 comprises a displayed image derived from the data of FIG. 9 using a MAP method as configured in accordance with various embodiments of the invention;

FIG. 14 comprises a displayed image derived from the real ARL data using a prior art DAS method;

FIG. 15 comprises a displayed image derived form the real ARL data using a MAP method as configured in accordance with various embodiments of the invention;

FIG. 26 comprises a displayed image derived from a second set of ARL data using a prior art DAS method;

FIG. 27 comprises a displayed image of the objects in the SOI of FIG. 26, in this case using image data processed according to prior art RSM algorithm;

FIG. 28 comprises a displayed image of the objects in the SOI of FIG. 26, in this case using image data processed according to an LMM algorithm;

FIG. 29 comprises a displayed image of the objects in the SOI of FIG. 26, in this case using image data processed according to an MAP algorithm using a Butterworth prior as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
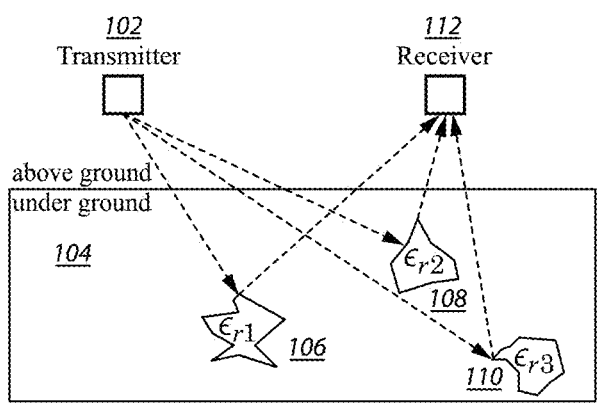
FIG. 1 comprises a schematic of operation a prior art GPR system.
Figure 2:
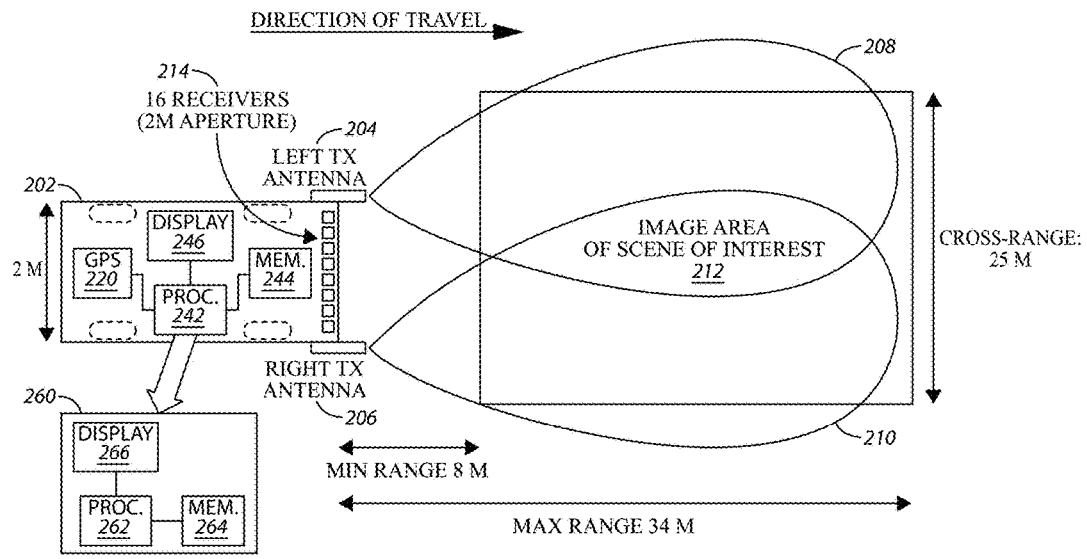
FIG. 2 comprises a schematic of an example radar system as configured in accordance with various embodiments of the invention.

Referring now to the drawings, and in particular to FIG. 2, an illustrative apparatus that is compatible with many of these teachings will now be presented. In a GPR application, a vehicle 202 includes a plurality of radar transmission devices 204 and 206 mounted on the vehicle 202. The radar transmission devices 204 and 206 are configured to transmit radar pulses 208 and 210 into a scene of interest 212. A plurality of J radar reception devices 214 are mounted on the vehicle 202 and configured to detect magnitude of signal reflections from the scene of interest 212 from the radar pulses 208 and 210. The vehicle 202 can be any structure able to carry the radar transmitters and receivers to investigate a scene of interest.

Figure 3:
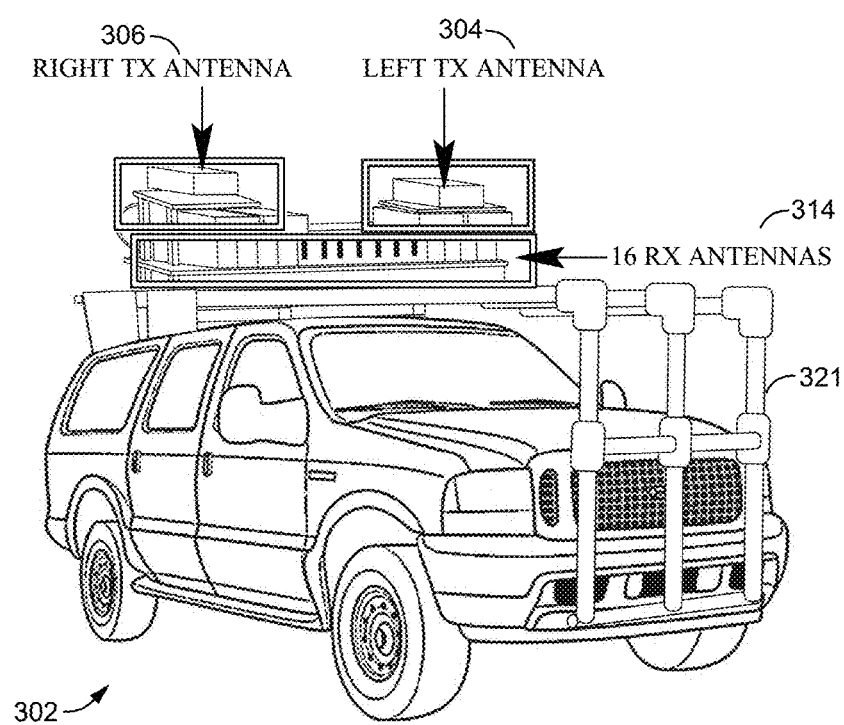
FIG. 3 comprises a perspective view of an example implementation of a prior art ultra wide-band (UWB) synchronous reconstruction (SIRE) radar system.

FIG. 3 illustrates one example implementation: a truck 302 mounted ultra wide-band (UWB) synchronous reconstruction (SIRE) radar system developed by the US Army Research Laboratory (ARL) in Adelphi, Md. This system includes a left transmit antenna 304, a right transmit antenna 306, and 16 receive antennas 314. Other systems may have different numbers of and arrangement of transmit and receive antennas. The transmit and receive antennas are mounted to a support structure 321, which supports these elements on the truck 302. The truck 302 drives through a scene of interest while the transmit antennas 304 and 306 alternately transmit radar pulses and the receiving antennas 314 receive reflections of the transmitted radar pulses from backscatter objects in the scene of interest.

Referring again to the example of FIG. 2, the positions along the vehicle's 202 path at which a radar pulse is transmitted are referred to as the transmit locations, I. As the vehicle 202 moves, the two transmit antennas 204 and 206 alternately send respective probing pulses 208 and 210 toward the SOI 212, and the radar-return profiles reflected from the SOI 212 are captured by multiple receive antennas 214 at each transmit location.

A location determination device 220 detects the location of the vehicle 202 at times of transmission of the radar pulse from the plurality of radar transmission devices 204 and 206 and reception of the signal reflections by the radar reception devices 214. In one example, the location determination device is a global positioning system (GPS) device as commonly known and used, although other position determination devices can be used. Accordingly, the positioning coordinates of the active transmit antenna 204 or 206 and all the receive antennas 214 are also logged. When using the UWB SIRE system of FIG. 3, there is typically a minimum range of detection of objects in the SOI from the vehicle 2020 of about 8 meters, a maximum range of about 34 meters, and a cross-range of about 25 meters. The UWB SIRE system uses a FORD EXPLORER as the vehicle 202 such that the transmit antennas 204 and 206 have about a two meter separation between 16 receivers.

In one approach, the vehicle 202 includes a processing device 242 in communication with the location determining device 220, the transmit antennas 204 and 206, and the receivers 214 to coordinate their various operations and to store information related to their operations in a memory device 244. Optionally, a display 246 is included with the vehicle 202 to display an image related to the data received from the scanning of the scene of interest 212.

Figure 4:
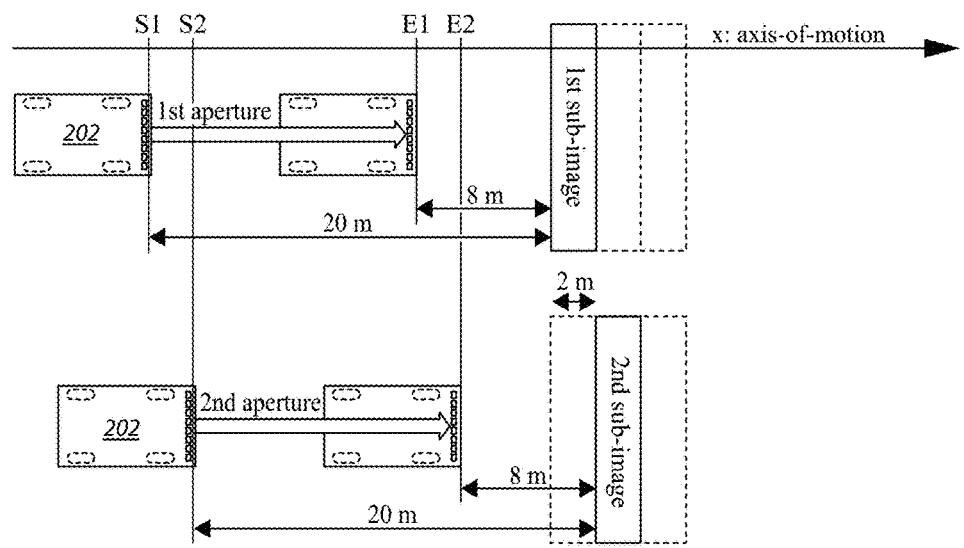
FIG. 4 comprises a schematic demonstrating a prior art approach to obtaining initial data from a SOI.

Due to the large size of the scene-of-interest, an initial data set is not generated by processing all voxels at once. Such an image would have cross-range resolution that varies from the near-range to the far-range voxels. The voxels in the near-range would have much larger resolution than those for the far-range ones. To create GPR images with consistent resolution across the scene-of-interest, we use the mosaicking approach discussed in L. Nguyen, "Signal and Image Processing Algorithms for the U.S. Army Research Laboratory Ultra-wideband (UWB) Synchronous Impulse Reconstruction (SIRE) Radar," ARL Technical Report, ARL-TR-4784, April 2009, which is incorporated by reference and described with reference to FIG. 4. The steps taken to produce a complete image of the scene-of-interest (using the mosaicking approach) are described as follows. The image space associated with the scene-of-interest is divided into 32 sub-images of size 25×2 m². Each sub-image has 250 voxels in the cross-range direction and 100 voxels in the down-range direction. Thus, each sub-image has L=25000 voxels. The aperture (meaning the distance over which the vehicle travels while accumulating data for a SOI) is divided into 32 sub-apertures corresponding to separate, overlapping distances traveled by the vehicle, where adjacent sub-apertures (or vehicle travel windows) overlap by approximately 2 meters. Each sub-aperture has 43 transmit locations and is approximately of size 12×2 m². The radar-return and location positioning measurements associated with a sub-aperture are used to estimate the reflectance coefficients for the corresponding sub-image. The reconstructed sub-images are merged together to obtain the complete image of the scene-of-interest.

In another approach, referring again to FIG. 2, a separate computing device 260 may receive an initial data set from the vehicle based system to further process to create and optionally display images related to the SOI. The computing device 260 will typically include a processing device 262 in communication with a memory 264 to allow for processing the data according to any of the methods described herein. A display 266 may be included with or separate from the computing device 260 and controlled to display images resulting from the processing of the data received from the vehicle 202. Those skilled in the art will recognize and appreciate that such processing devices 242 and 262 can comprise a fixed-purpose hard-wired platform, including, for example, parallel processing devices, or can comprise a partially or wholly programmable platform. All of these architectural options are well known and understood in the art and require no further description here. Moreover, the memory devices 244 and 264 may be separate from or combined with the respective processing devices 242 and 262. Any memory device or arrangement capable of facilitating the processing described herein may be used.

With respect to the collection of data, consider a single scatterer, with spatial position $p_s$, located at the center of a voxel (i.e., volume element) within the SOI. The spatial positions of the active transmit antenna and a receive antenna are denoted by $p_t$ and $p_r$, respectively. If the contributions of measurement noise are momentarily ignored, the relationship between the transmitted signal p(t) and the received signal $g_s(t)$ can be modeled as $$g_s(t) = \alpha_s \cdot p(t - \tau(p_s, p_t, p_r)) \cdot x_s, \quad (2)$$

where $x_s$ is the reflection coefficient of the voxel, $\tau(p_s, p_t, p_r)$ is the time it takes for the pulse to travel from the transmit antenna to the scatterer and back to the receive antenna, and $\alpha_s$ is the attenuation the pulse undergoes along the round-trip path.

The single scatterer model in (2) can be generalized to describe all the measurements captured by the SIRE GPR system. The SOI is subdivided into a rectangular grid of L voxels and the unknown reflection coefficient at the $l^{th}$ voxel is denoted by $x_l$. Extending the model in (2) to the SIRE system, the output of the $j^{th}$ receive antenna at the $i^{th}$ vehicle-stop is given by $$s_{ij}(t) = \sum_{l=1}^{L} \alpha_{ijl} \cdot p(t - \tau_{ijl}) \cdot x_l + w_{ij}(t), \quad (3)$$

$$i = 1, 2, \ldots, I,$$

$$j = 1, 2, \ldots, J.$$

In this equation, $\tau_{ijl}$ is the time it takes for the transmitted pulse to propagate from the active transmit antenna at the $i^{th}$ transmit location to the $l^{th}$ voxel and for the backscattered signal to return to the $j^{th}$ receive antenna. The parameter $\tau_{ijl}$ is given by $$\tau_{ijl} = \frac{d_{il} + d_{ijl}}{c}, \quad (4)$$

where $d_{il}$ denotes the distance from the active transmit antenna at the $i^{th}$ transmit location to the $l^{th}$ voxel, $d_{ijl}$ denotes the return distance from the $l^{th}$ voxel to the $i^{th}$ receive antenna when the truck is at the $i^{th}$ transmit location, and c is the speed of light.

The notation $\alpha_{ijl}$ is the propagation loss that the transmitted pulse undergoes as it travels from the active transmit antenna at the $i^{th}$ transmit location to the $l^{th}$ voxel and back to the $j^{th}$ receive antenna. The parameter $\alpha_{ijl}$ is given by $$\alpha_{ijl} = \frac{1}{d_{il} \cdot d_{ijl}}. \quad (5)$$

The notation $w_{ij}(t)$ represents the noise contribution.

The above mathematical model defined in (3) is continuous whereas, in practice, the SIRE GPR system only stores discrete and separate sampled versions of the return signals. Thus, we introduce the following discrete-time signals to adpat the above model to the real world application: for i=1, 2, ..., I, j=1, 2, ..., J and n=0, 1, ..., N-1, $$y_{ij}[n] \triangleq s_{ij}(nT_s) \quad (6)$$

$$e_{ij}[n] \triangleq w_{ij}(nT_s) \quad (7)$$

where $T_s$ is the sampling interval and N is the number of samples per radar return. From (6) and (7), we can express $y_{ij}[n]$ as $$y_{ij}[n] = \sum_{l=1}^{L} x_l \alpha_{ijl} p(nT_s - \tau_{ijl}) + e_{ij}[n] \qquad (8)$$

and write the corresponding system of equations $$y_{ij}[0] = x_1\alpha_{ij1}p(0 \cdot T_s - \tau_{ij1}) + \\ x_2\alpha_{ij2}p(0 \cdot T_s - \tau_{ij2}) + \ldots + x_L\alpha_{ijL}p(0 \cdot T_s - \tau_{ijL}) + e_{ij}[0] \qquad (9)$$

$$y_{ij}[1] = x_1\alpha_{ij1}p(1 \cdot T_s - \tau_{ij1}) + \\ x_2\alpha_{ij2}p(1 \cdot T_s - \tau_{ij2}) + \ldots + x_L\alpha_{ijL}p(1 \cdot T_s - \tau_{ijL}) + e_{ij}[1] \qquad (10)$$

$$\vdots$$

$$y_{ij}[N-1] = x_1\alpha_{ij1}p((N-1) \cdot T_s - \tau_{ij1}) + x_2\alpha_{ij2}p((N-1) \cdot T_s - \tau_{ij2}) + \\ \ldots + x_L\alpha_{ijL}p((N-1) \cdot T_s - \tau_{ijL}) + e_{ij}[N-1] \qquad (11)$$

This system of equations can be written in matrix form as $$y_{ij} = A_{ij}x + e_{ij} \qquad (12)$$

where the L×1 vector x, and N×1 vectors $y_{ij}$ and $e_{ij}$ are defined to be $$x = \begin{bmatrix} x_1 \\ x_2 \\ \vdots \\ x_L \end{bmatrix}, \qquad (13)$$

$$e_{ij} = \begin{bmatrix} e_{ij}[0] \\ e_{ij}[1] \\ \vdots \\ e_{ij}[N-1] \end{bmatrix},$$

$$y_{ij} = \begin{bmatrix} y_{ij}[0] \\ y_{ij}[1] \\ \vdots \\ u_{ij}[N-1] \end{bmatrix}.$$

The matrix $A_{ij}$ is an N×L matrix that contains shifted and scaled versions of the transmitted pulse. From (9)-(11), the matrix $A_{ij}$ is defined to be $$A_{ij} \triangleq \begin{bmatrix} \alpha_{ij1}p(0 \cdot T_s - \tau_{ij1}) & \alpha_{ij2}p(0 \cdot T_s - \tau_{ij1}) & \ldots & \alpha_{ijL}p(0 \cdot T_s - \tau_{ijL}) \\ \alpha_{ij1}p(1 \cdot T_s - \tau_{ij1}) & \alpha_{ij2}p(1 \cdot T_s - \tau_{ij1}) & \ldots & \alpha_{ijL}p(1 \cdot T_s - \tau_{ijL}) \\ \vdots & \vdots & \ddots & \\ \alpha_{ij1}p\begin{pmatrix}(N-1)\cdot \\ T_s - \tau_{ij1}\end{pmatrix} & \alpha_{ij2}p\begin{pmatrix}(N-1)\cdot \\ T_s - \tau_{ij2}\end{pmatrix} & \ldots & \alpha_{ijL}p\begin{pmatrix}(N-1)\cdot \\ T_s - \tau_{ijL}\end{pmatrix} \end{bmatrix} \qquad (14)$$

We concatenate the sampled data vectors $\{y_{ij}\}$ for all transmitter and receiver pairs to obtain the K×1 data vector y $$y \triangleq [y_{11}^T, y_{12}^T, \ldots, y_{1J}^T, y_{21}^T, y_{22}^T, \ldots, \\ y_{2J}^T, \ldots, y_{I1}^T, y_{I2}^T, \ldots, y_{IJ}^T]^T \qquad (15)$$

where K=IJN. Extending (12) to account for all transmitter and receiver pairs yields the desired model $$y = Ax + e \qquad (16)$$

where A is a known K×L matrix given by $$A \triangleq [A_{11}^T, A_{12}^T, \ldots, A_{1J}^T, A_{21}^T, A_{22}^T, \ldots, \\ A_{2J}^T, \ldots, A_{I1}^T, A_{I2}^T, \ldots, A_{IJ}^T]^T \qquad (17)$$

and $e \triangleq [e_{11}^T, e_{12}^T, \ldots, e_{1J}^T, e_{21}^T, e_{22}^T, \ldots, e_{2J}^T, \ldots, e_{I1}^T, e_{I2}^T, \ldots, e_{IJ}^T]^T$ is a K×1 noise vector that is assumed to be zero mean Gaussian white noise with variance $\sigma^2$.

Given the transmitted pulse p(t) and observed data y, the problem is to estimate the reflectance coefficient vector x. Note, the time delays $\{\tau_{ijl}\}$ and attenuation values $\{\alpha_{ijl}\}$ are computed using (4) and (5), respectively, and the geometry defined by the chosen SOI and the locations of the transmit and receive antennas.

The Majorize-Minimize Principle

The MM (which stands for majorize-minimize in minimization problems, and minimize-majorize in maximization problems) principle is a prescription for constructing solutions to optimization problems. An MM algorithm minimizes an objective function by successively minimizing, at each iteration, a judiciously chosen objective function that is known as a majorizing function. Whenever a majorizing function is optimized, in principle, a step is taken toward reaching the minimizer of the original objective function. A brief summary of the MM principle is now given with reference to FIG. 5.

Let $f$ be a function to be minimized over some domain $D \in \mathbb{R}^L$, i.e., the function's minimum value is to be found within the given domain. A real value function g with domain D×D is said to majorize $f$ if $$g(x,y) \geq f(x) \text{ for all } x, y \in D \qquad (18)$$

$$g(x,x) = f(x) \text{ for all } x \in D. \qquad (19)$$

Figure 5:
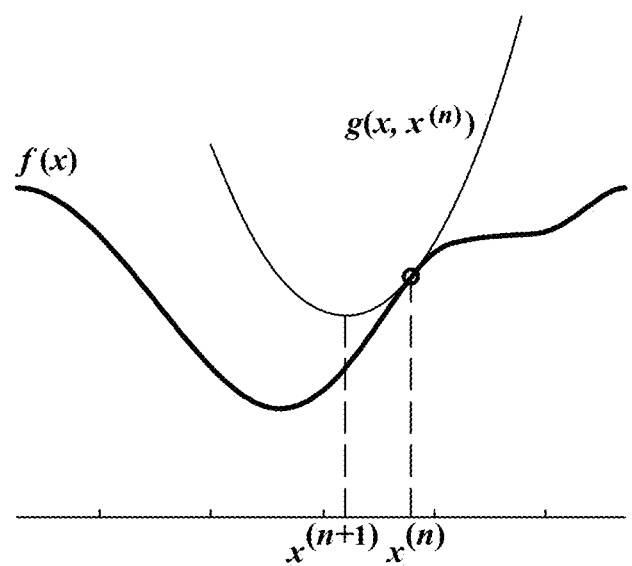
FIG. 5 comprises a graph demonstrating application of the mathematical majorize-minimize principle.

Suppose the majorizing function g is easier to minimize than the original objective function $f$. Then, the MM algorithm for minimizing $f$ is given by $$x^{(m+1)} = \underset{x \in D}{\operatorname{argmin}} g(x, x^{(m)}), \qquad (20)$$

where $x^{(m)}$ is the current estimate for the minimizer of $f$. The algorithm defined by (20), which is illustrated in FIG. 5, is guaranteed to monotonically decrease the objective function $f$ with increasing iteration. In other words, a further minimal or smaller value for the function $f$ is obtained with each iteration of the algorithm, stepping between successive functions g. To see this result, first observe that, by definition, $$g(x^{(m+1)}, x^{(m)}) \leq g(x^{(m)}, x^{(m)}). \qquad (21)$$

Now from (18) and (19), it follows that $$f(x^{(m+1)}) \leq g(x^{(m+1)}, x^{(m)}) \leq g(x^{(m)}, x^{(m)}) = f(x^{(m)}). \qquad (22)$$

In other words and as illustrated in FIG. 5, the function $g(x, x^{(n)})$ intersects with the function $f(x)$ at $x^{(n)}$ and also has a further minimum at point $x^{(n+1)}$. That further minimum point is used in the next iteration as a new $g(x^{(m)})$ from which a new minimum at a new $x^{(n+1)}$ may be determined.

Maximum A Posteriori Estimation: MAP Objective Function

There are many estimation methods that could be used to estimate the reflectance coefficients. The described approach uses the MAP method because it allows for the incorporation of a priori information in a relatively straightforward manner. Let Y and X represent the random vectors underlying the data y and reflectance coefficient vector x, respectively. From the white Gaussian noise assumption, it follows from (16) that the conditional density function of Y given that X=x is a multivariate Gaussian density function with mean E[Y]=Ax and covariance matrix $C=\sigma^2 I_K$, where $I_K$ is the K×K identity matrix. The a posteriori density function of X given that Y=y can be expressed as $$f_{X|Y}(x\mid y) = \frac{f_{Y|X}(y\mid x)f_X(x)}{f_Y(y)} \quad (23)$$

where $f_X(x)$ and $f_Y(y)$ are the joint density functions of the reflectance coefficients and data, respectively. Under the additional assumption that the reflectance coefficients are independent and identically distributed, the MAP estimate is given by $$\hat{x}_{MAP} = \underset{x}{\operatorname{argmax}}\ f_{x|y}(x\mid y) \quad (24)$$

$$= \underset{x}{\operatorname{argmin}} -\log\left[\frac{1}{((2\pi)^K|C|)^{\frac{1}{2}}}\exp\left(-\frac{1}{2}(y-Ax)^T C^{-1}(y-Ax)\right)\right] - \quad (25)$$

$$\log f_x(x)$$

$$= \underset{x}{\operatorname{argmin}}\ \frac{K}{2}\log(\sigma^2) + \frac{1}{2\sigma^2}\phi_1(x) + \phi_2(x) \quad (26)$$

where $$\phi_1(x) \triangleq \|y - Ax\|_2^2 \quad (27)$$

$$\phi_2(x) \triangleq -\log\prod_{l=1}^L f(x_l) \quad (28)$$

and $f$ is the chosen prior density function for the reflectance coefficients. In the following sections, several density functions are described that can provide reasonable models for the prior distribution of the reflectance coefficients.

First Prior Probability Function:
Joint Probability Density Function of Reflectance Coefficients To promote sparsity, the density function $f$ should be an even function with long tails, and have the property that values near zero occur with high probability. The first approach follows $$f(x_l) \triangleq \frac{k(\lambda)}{1 + \exp(\lambda|x|)} \quad (29)$$

where the constant $\lambda$ controls the degree of sparsity and $k(\lambda)$ is a normalizing constant. The value of the normalizing constant was determined to be $$k(\lambda) = \frac{\lambda}{\log 4}.$$

Proposed MAP Algorithm for First Prior Probability Function

We define $\varphi$ to be the MAP objective function and express this function as (with the first two terms being the data component and the last term representing the prior probability density function)

$$\phi(x) = \frac{1}{2\sigma^2}\phi_1(x) + \frac{K}{2}\log\sigma^2 + \sum_{l=1}^L s(x_l) \quad (30)$$

where $$\phi_1(x) \triangleq \|y - Ax\|_2^2 \quad (31)$$

$$s(a) \triangleq -\log f(a) = -\log\frac{\frac{\lambda}{\log 4}}{1 + \exp(\lambda|a|)} \quad (32)$$

From (46), it follows that to minimize $\varphi$ we must find majorizing functions for both $\varphi_1$ and s.

De Pierro showed in "A modified expectation maximization algorithm for penalized likelihood estimation in emission tomography," Medical Imaging Processing, IEEE Transactions on, vol. 14, no. 1, pp. 132-137, 1995, and incorporated by reference, that a majorizing function for $\varphi_1$ at the current iterate $x^{(m)}$ is given by $$q_1(x, x^{(m)}) = \sum_{k=1}^K \left(y_k^2 - 2y_k[Ax]_k + \sum_{l=1}^L r(x, x^{(m)})\right) \quad (33)$$

where $$r(x, x^{(m)}) \triangleq c_{kl}(n_k A_{kl} x_l - n_k A_{kl} x_l^{(m)} + [Ax^{(m)}]_k)^2,$$

$$[Ax]_k \triangleq \sum_{l=1}^L A_{kl} x_l$$

is the $k^{th}$ component of the vector Ax, $n_k$ is the number of non-zero elements in the $k^{th}$ row of A, and $$c_{kl} \triangleq \begin{cases} n_k^{-1}, & A_{kl} \neq 0 \\ 0, & A_{kl} = 0 \end{cases} \quad (34)$$

Using the theorem 4.5 in J. de Leeuw and K. Lange, "Sharp quadratic majorization in one dimension," Computational statistics and data analysis, vol. 53, no. 7, pp. 2471-2484, 2009, which is incorporated by reference herein, the best quadratic majorizer for the function s at the point b is given by $$q_2(a, b) = \frac{s'(b)}{2b}(a^2 - b^2) + s(b) \quad (35)$$

where the derivative of s is equal to $$s'(a) = \frac{\lambda a \exp(\lambda|a|)}{|a|[1 + \exp(\lambda|a|)]} \quad (36)$$

Thus, a majorizing function for the MAP objective function $\varphi$ is obtained by substituting $q_1$ for $\varphi_1$ and $q_2$ for s in (46)

$$Q(x, x^m) = \frac{1}{2\sigma^2} q_1(x, x^{(m)}) + \frac{K}{2} \log \sigma^2 + \sum_{l=1}^{L} \left[ \frac{s'(x_l^{(m)})}{2 x_l^{(m)}} (x_l^2 - x_l^{2(m)}) + s(x_l^{(m)}) \right] \quad (37)$$

Taking the derivative of the majorizing function Q with respect to $x_l$ and setting the result to zero yields the desired update for the $l^{th}$ reflectance coefficient, $l=1, 2, \ldots, L$ $$x_l^{(m+1)} = \frac{\sum_{k=1}^{K} A_{kl}(y_k - [Ax^{(m)}]_k) + \sum_{k=1}^{K} n_k A_{kl}^2 x_l^{(m)}}{\sum_{k=1}^{K} n_k A_{kl}^2 + \frac{\sigma^2 s'(x_l^{(m)})}{x_l^{(m)}}} \quad (38)$$

Estimation of $\sigma^2$ and $\lambda$ for First Prior Density Function

One possible choice for the initial reflectance vector is the estimate obtained from the DAS algorithm, which we denote by $x_{DAS}$. However, the quantity $[Ax_{DAS}]_k$, which is an estimate of the $k^b$ noise-free data point, is typically much greater than the $k^{th}$ observed data point, $y_k$. Therefore, we use $x^{(0)} \triangleq \hat{c} x_{DAS}$ as the initial estimate where $$\hat{c} = \arg\min_c \|y - cAx_{DAS}\|_2^2 = \frac{\sum_{k=1}^{K} y_k [Ax_{DAS}]_k}{\sum_{k=1}^{K} [Ax_{DAS}]_k^2} \quad (39)$$

The parameters $\sigma^2$ and $\lambda$ are chosen to be $$\hat{\sigma}^2 = \arg\min_{\sigma^2} \phi(\sigma^2, x^{(0)}) = \frac{\|y - Ax^{(0)}\|_2^2}{K} \quad (40)$$

$$\hat{\lambda} = \arg\min_{\lambda} \phi(\lambda, x^{(0)}) \quad (41)$$

where the optimization problem in (41) is solved using a 1D line search. With these choices, $\sigma^2$ and $\lambda$ in (38) are replaced by $\hat{\sigma}^2$ and $\hat{\lambda}$ to estimate the reflectance coefficients in this approach.

Second and Third Prior Probability Functions:
Jeffreys' Non-Informative Prior and Laplacian-Like Prior The second approach for the prior probability density function is the Jeffreys' non-informative prior $$f(a) \triangleq \prod_{l=1}^{L} \frac{1}{|a|} \quad (42)$$

which is an improper prior because its area is infinite. This prior is in fact an amplitude-scaled invariance prior, which means that the units in which a quantity is measured do not influence the resulting conclusion. It turns out that the Jeffreys' prior is an extremely heavy-tailed density function and therefore is able to enforce the sparsity assumption. The Jeffreys' prior is parameter-free and thus may be suitable for a wide-range of applications.

We refer to the third approach as the Laplacian-like prior, which follows $$f(a; \lambda) \triangleq \frac{k(\lambda)}{1 + \exp(\lambda|a|)} \quad (43)$$

where the constant $\lambda$ controls the degree of sparsity and $k(\lambda)$ is a normalizing constant. The value of the normalizing constant was determined to be $$k(\lambda) = \frac{\lambda}{\log 4}$$

by solving the equation $$\int_{-\infty}^{\infty} \frac{k(\lambda)}{1 + \exp(\lambda|a|)} da = 1 \quad (44)$$

Hence, the proposed sparsity inducing probability density function can be expressed as $$f(a; \lambda) = \frac{\frac{\lambda}{\log 4}}{1 + \exp(\lambda|a|)} \quad (45)$$

Figure 6:
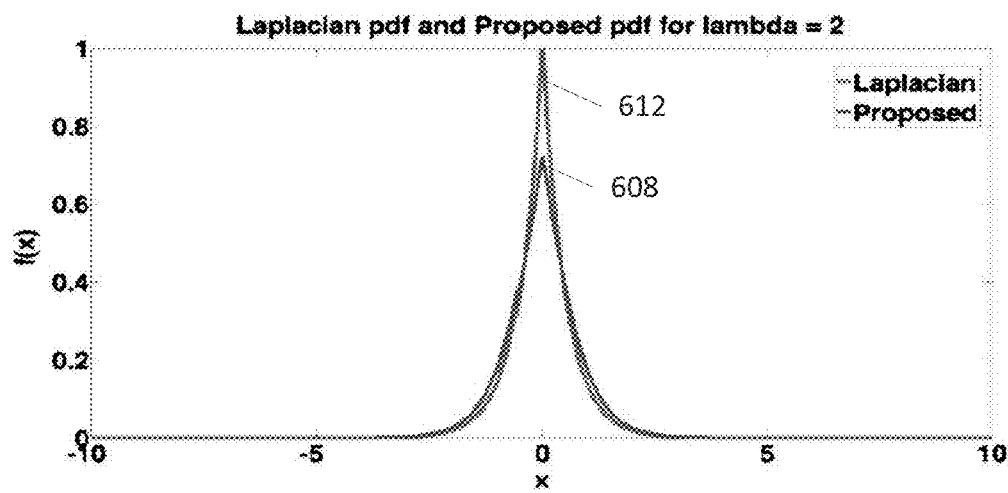
FIG. 6 comprises a graph illustrating a Laplacian prior density function (pdf) and a Laplacian-like prior density function as configured in accordance with various embodiments of the invention.

FIG. 6 illustrates plots of the Laplacian-like prior density function 608 and the Laplacian probability density function 612 for the purpose of making a comparison.

GMR Algorithm for Jeffreys' and Laplacian-Like Priors

In this section, we present the MM based GMR algorithm, which reconstructs GPR images by iteratively minimizing the negative MAP objective function, for the Jeffreys' and Laplacian-like priors. First, we consider the case where the noise variance, $\sigma^2$, and prior parameter, $\theta$, are known. Then we consider the case where both of these quantities are unknown.

Where the noise variance and PDF parameter are known, it will be convenient to define a function $\varphi$ to be the objective function on the right hand side of (26) and express this function as $$\phi(x) = \frac{1}{2\sigma^2} \phi_1(x) + \frac{K}{2} \log(\sigma^2) + \sum_{l=1}^{L} s(x_l; \theta) \quad (46)$$

where $$\phi_1(x) \triangleq \|y - Ax\|_2^2 \quad (47)$$

$$s(a; \theta) \triangleq -\log f(a; \theta) \quad (48)$$

For convenience, we will refer to the function $s(\bullet; \theta)$ as the negative log prior.

From (46), it follows that to minimize the negative MAP objective function $\varphi$ using the MM technique we must find majorizing functions for both $\varphi_1$ and s. In the context of reconstructing positron emission tomography images, De Pierro developed a majorizing function for linear least-squares objective functions (see A. R. De Pierro, "A modified expectation maximization algorithm for penalized likelihood estimation in emission tomography" *IEEE transactions, medical imagery* pp 132-137, 1995, which is incorporated by reference herein). Using his result, a majorizing function for $\varphi_1$ at the current iterate $x^{(m)}$ is given by $$q_1(x; x^{(m)}) = \sum_{k=1}^{K} \left( y_k^2 - 2y_k [Ax]_k + \sum_{l=1}^{L} r(x_l, x^{(m)}) \right) \qquad (49)$$

where $$r(x_l, x^{(m)}) \triangleq c_{kl}(n_k A_{kl} x_l - n_k A_{kl} x_l^{(m)} + [Ax^{(m)}]_k)^2 \qquad (50)$$

$$n_k \triangleq \text{number of non-zero elements in the } k^{th} \text{ row of } A \qquad (51)$$

$$c_{kl} \triangleq \begin{cases} n_k^{-1}, & A_{kl} \neq 0 \\ 0, & A_{kl} = 0 \end{cases}, \qquad (52)$$

$$[Ax]_k \triangleq \sum_{l=1}^{L} A_{kl} x_l \qquad (53)$$

Now, we address the problem of determining a majorizing function for the function $s(\bullet;\theta)$ by exploiting the following theorem by de Leeuw and Lang (J. de Leeuw and K. Lange, "Sharp Quadratic Majorization in One Dimension" *Computational Statistics and Data Analysis* vol. 53 no. 1 pp 2478 February 2004, which is incorporated by reference herein) Suppose d(a) is an even, differentiable function on R such that the ratio d'(a)/a is decreasing on (0, ∞). Then, the following function $$z(a, b) \triangleq \frac{d'(b)}{2b}(a^2 - b^2) + d(b) \qquad (54)$$

is the best quadratic majorizing function for d at the point b. Assuming that the negative log prior satisfies the conditions of de Leeuw and Lang's theorem, then a majorizing function for this function at the point b is $$z(a, b; \theta) \triangleq \frac{s'(b; \theta)}{2b}(a^2 - b^2) + s(b; \theta) \qquad (55)$$

In turn, it follows that a majorizing function for the term $$\sum_{l=1}^{L} s(x_l; \theta)$$

in (46) about the current iterate $x^{(m)}$ is $$\sum_{l=1}^{L} \left[ \frac{s'(x_l^{(m)}; \theta)}{2x_l^{(m)}}(x_l^2 - x_l^{2(m)}) + s(x_l^{(m)}; \theta) \right] \qquad (56)$$

Given the results in (49) and (56), we can conclude that $$Q(x, x^{(m)}) = \frac{1}{2\sigma^2} q_1(x, x^{(m)}) + \frac{K}{2} \log \sigma^2 + \qquad (57)$$

$$\sum_{l=1}^{L} \left[ \frac{s'(x_l^{(m)}; \theta)}{2x_l^{(m)}}(x_l^2 - x_l^{2(m)}) + s(x_l^{(m)}; \theta) \right]$$

is a majorizing function for the negative MAP objective function $\varphi$ about the current iterate $x^{(m)}$. The proposed GMR algorithm of this approach follows by taking the derivative of Q with respect to $x_l$ and setting the result to zero. From straightforward calculations $$\frac{\partial Q(x, x^{(m)})}{\partial x_l} = \qquad (58)$$

$$\frac{1}{\sigma^2}\left[ -\sum_{k=1}^{K} A_{kl}(y_k - [Ax^{(m)}]_k) + (x_l - x_l^{(m)})\sum_{k=1}^{K} n_k A_{kl}^2 \right] + x_l \frac{s'(x_l^{(m)}; \theta)}{x_l^{(m)}}$$

Equating the derivative in (58) to zero yields the desired update $$x_l^{(m+1)} = \frac{G_l^{(m)} + x_l^{(m)} H_l}{H_l + \frac{\sigma^2 s'(x_l^{(m)}; \theta)}{x_l^{(m)}}} \qquad (59)$$

where $G_l^{(m)}$ and $H_l$ are defined as, $$G_l^{(m)} \triangleq \sum_{k=1}^{K} A_{kl}(y_k - [Ax^{(m)}]_k) \qquad$$

$$G_l^{(m)} \triangleq \sum_{k=1}^{K} A_{kl}(y_k - [Ax^{(m)}]_k) \qquad (60)$$

$$H_l \triangleq \sum_{k=1}^{K} n_k A_{kl}^2 \qquad (61)$$

A careful observation of (59) reveals that the process of estimating the individual reflection coefficients is decoupled in the sense that, for any voxel, the computation of the next estimate depends only on the previous estimate. As a result, this algorithm can be easily parallelized to enhance its computational speed. It should also be mentioned that a fast memory efficient method for computing (60) and (61) has been developed (see U.S. patent application Ser. No. 14/184,446 filed Feb. 19, 2014, published as U.S. Pat. App. Pub. No. 2015/0279082, which is incorporated by reference herein) and which fast methods are described below. Therefore, this GMR algorithm is expected to be applicable to real-world GPR imaging problems with high dimensionality data.

For the Jeffreys' prior, we have that $$s(a) = -\log\frac{1}{|a|} \quad (62)$$

$$\frac{s'(a)}{a} = \frac{1}{a^2} \quad (63)$$

Because the conditions of de Leeuw and Lange's theorem are met, the GMR algorithm for the Jeffreys' prior is $$x_l^{(m+1)} = \frac{G_l^{(m)} + x_l^{(m)} H_l}{H_l + \sigma^2 \frac{1}{(x_l^{(m)})^2}} \quad (64)$$

For the Laplacian-like prior, the negative log prior $s(a;\lambda)$ and function $$\frac{s'(a;\lambda)}{a}$$

follow $$s(a;\lambda) = -\log\frac{\frac{\lambda}{\log 4}}{1 + \exp(\lambda|a|)} \quad (65)$$

$$\frac{s'(a;\lambda)}{a} = \frac{\lambda \exp(\lambda|a|)}{|a|(1 + \exp(\lambda|a|))} \quad (66)$$

Like the Jeffreys' prior, the Laplacian-like prior satisfies the conditions of de Leeuw and Lange's theorem so the corresponding GMR algorithm is $$x_l^{(m+1)} = \frac{G_l^{(m)} + x_l^{(m)} H_l}{H_l + \sigma^2 \frac{\lambda \exp(\lambda|x_l^{(m)}|)}{|x_l^{(m)}|(1 + \exp(\lambda|x_l^{(m)}|))}} \quad (67)$$

Similarly, as an alternative approach, the Laplacian prior can be used as well. In this case, the negative log prior $s(a;\lambda)$ and function $$\frac{s'(a;\lambda)}{a}$$

for the Laplacian prior follow $$s(a;\lambda) = -\log\frac{\lambda}{2}\exp(-\lambda|a|) \quad (68)$$

$$\frac{s'(a;\lambda)}{a} = \frac{\lambda}{|a|} \quad (69)$$

Like the Jeffreys' prior and Laplacian-like prior, the Laplacian prior satisfies the conditions of de Leeuw and Lange's theorem so the corresponding GMR algorithm is $$x_l^{(m+1)} = \frac{G_l^{(m)} + x_l^{(m)} H_l}{H_l + \sigma^2 \frac{\lambda}{|x_l^{(m)}|}} \quad (70)$$

Previously, we assumed that the noise variance, $\sigma^2$, and prior parameter, $\theta$, were known. However, oftentimes in practice these quantities are unknown. We present in this section a procedure to jointly estimate the reflection coefficient vector, noise power and prior parameter. For simplicity, we will consider the Laplacian-like prior parameter.

First, we modify the notation to account for the fact that the negative MAP objective function, $\varphi$, and majorizing function, Q, now explicitly depend on $\lambda$ and $\sigma^2$. Thus, $\varphi(x)$ and $Q(x; x^{(m)})$ are now expressed as $\varphi(x, \lambda, \sigma^2)$ and $Q(x, \lambda, \sigma^2; x^{(m)})$, respectively The cyclic optimization method given below could in principle be used to jointly estimate the reflectance coefficient vector, x, noise variance, $\sigma^2$, and Laplacian-like prior parameter, $\lambda$:

for m=0, 1, . . . , niter do $$x^{(m+1)} = \operatorname*{argmin}_x \phi(x, \lambda^{(m)}, \sigma^{2(m)}) \quad (71)$$

$$\lambda^{(m+1)} = \operatorname*{argmin}_{\lambda > 0} \phi(x^{(m+1)}, \lambda, \sigma^{2(m)}) \quad (72)$$

$$\sigma^{2(m+1)} = \operatorname*{argmin}_{\sigma^2 > 0} \phi(x^{(m+1)}, \lambda^{(m+1)}, \sigma^2) \quad (73)$$

end for where $\lambda^{(m)}$ and $\sigma^{2(m)}$ are the $m^{th}$ iterates of $\lambda$ and $\sigma^2$, respectively.

Instead of solving the minimization problem in (71) it will be convenient to find an iterate $x^{(m+1)}$ that decreases the negative MAP objective function $\varphi(x, \lambda, \sigma^2)$ in the following sense $$\varphi(x^{(m+1)},\lambda^{(m)},\sigma^{2(m)}) \leq \varphi(x^{(m)},\lambda^{(m)},\sigma^{2(m)}) \quad (74)$$

Taking into account the discussion above regarding noise variance and PDF parameters, an iterate that satisfies (74) can be found by minimizing the majorizing function $Q(x, \lambda^{(m)}, \sigma^{2(m)}; x^{(m)})$ (i.e., (57) with $\theta$ and $\sigma^2$ replaced with $\lambda^{(m)}$ and $\sigma^{2(m)}$, respectively. Thus, a solution to (71) is $$x^{(m+1)} \triangleq \operatorname*{argmin}_x Q(x, \lambda^{(m)}, \sigma^{2(m)}; x^{(m)}) \quad (75)$$

The minimization problem in (72) can be solved using a one-dimensional line search such as the golden section search method. Implicitly, we have assumed that an interval can be determined that contains the minimizer of $\varphi(x^{(m+1)}, \lambda, \sigma^{2(m)})$. Finally, we estimate the noise power by obtaining a closed form expression for the minimizer of $\varphi(x^{(m+1)}, \lambda^{(m+1)}, \sigma^2)$. Putting the above ideas altogether, an alternative to the algorithm defined by (71)-(73) is summarized below for m=0, 1, . . . , niter do $$x^{(m+1)} = \operatorname*{argmin}_x Q(x, \lambda^{(m)}, \sigma^{2(m)}; x^{(m)}) \quad (76)$$

$$x^{(m+1)} = \arg\min_{\lambda_l \leq \lambda \leq \lambda_k} \phi(x^{(m+1)}, \lambda, \sigma^{2(min)}) \quad (77)$$

$$= \arg\min_{\lambda_l \leq \lambda \leq \lambda_k} \sum_{l=1}^{L} -\log f(x_l^{(m+1)}; \lambda) \quad (78)$$

-continued $$\sigma^{2(m+1)} = \operatorname*{argmin}_{\sigma^2} \phi(x^{(m+1)}, \lambda^{(m+1)}, \sigma^2) \quad (79)$$

$$\operatorname*{argmin}_{\sigma^2} \frac{K}{2}\log\sigma^2 + \frac{1}{2\sigma^2}\phi_1(x^{(m+1)}) \quad (80)$$

end for

We will now show that the cyclic minimization algorithm defined by (76)-(80) is guaranteed to monotonically decrease the MAP objective function $\varphi(x, \lambda, \sigma^2)$. From (76), it follows that $\varphi(x^{(m)}, \lambda^{(m)}, \sigma^{2(m)}) \geq \varphi(x^{(m+1)}, \lambda^{(m)}, \sigma^{2(m)})$. Also (78) implies that $\varphi(x^{(m+1)}, \lambda^{(m)}, \sigma^{2(m)}) \geq \varphi(x^{(m+1)}, \lambda^{(m+1)}, \sigma^{2(m)})$. Finally, it can be observed from (80) that $\varphi(x^{(m+1)}, \lambda^{(m+1)}, \sigma^{2(m)}) \geq \varphi(x^{(m+1)}, \lambda^{(m+1)}, \sigma^{2(m+1)})$. Therefore, $$\varphi(x^{(m)}, \lambda^{(m)}, \sigma^{2(m)}) \geq \varphi(x^{(m+1)}, \lambda^{(m+1)}, \sigma^{2(m+1)}) \quad (81)$$

Thus, the iterates obtained from the cyclic minimization technique described above are guaranteed to monotonically decrease the objective function $\varphi(x, \lambda, \sigma^2)$.

The solution to (76) was discussed above and is given by (67) with $\lambda$ and $\sigma^2$ replaced by $\lambda^{(m)}$ and $\sigma^{2(m)}$, respectively $$x_l^{(m+1)} = \frac{G_l^{(m)} + x_l^{(m)} H_l}{H_l + \sigma^{2(m)} \frac{\lambda^{(m)} \exp(\lambda^{(m)}|x_l^{(m)}|)}{|x_l^{(m)}|(1 + \exp(\lambda^{(m)}|x_l^{(m)}|))}} \quad (82)$$

To obtain the estimate for the noise power, we set the derivative of $\varphi(x^{(m+1)}, \lambda^{(m+1)}, \sigma^2)$ with respect to $\sigma^2$ to zero and solve the resulting equation. The derivative of $\varphi(x^{(m+1)}, \lambda^{(m+1)}, \sigma^2)$ with respect to $\sigma^2$ equals $$\frac{\partial \phi(x^{(m+1)}, \lambda^{(m+1)}, \sigma^2)}{\partial \sigma^2} = \frac{K}{2\sigma^2} - \frac{1}{2(\sigma^2)^2}\|y - Ax^{(m+1)}\|_2^2 \quad (83)$$

Setting this derivative to zero yields for this approach the maximum likelihood estimate of the noise power $$\sigma^{2(m+1)} = \frac{1}{K}\|y - Ax^{(m+1)}\|_2^2 \quad (84)$$

Now, given our discussion above, it follows that for the case of the Laplacian prior that the update for the reflection coefficient vector is equal to $$x_l^{(m+1)} = \frac{G_l^{(m)} + x_l^{(m)} H_l}{H_l + \sigma^{2(m)} \frac{\lambda^{(m)}}{|x_l^{(m)}|}} \quad (85)$$

Recall the following well known result: Given n observations $w_1, w_2, \ldots, w_n$ of a Laplacian probability density function with unknown parameter $\mu$, the maximum likelihood estimate of $\mu$ is $$\hat{\mu} = \frac{1}{n}\sum_{r=1}^{n}|w_r|.$$

From this result, we can conclude that $$\lambda^{(m+1)} = \frac{1}{L}\sum_{l=1}^{L}|x_l^{(m+1)}| \quad (86)$$

is the solution to (78) for the Laplacian prior. As in the Laplacian-like prior case, the update for the noise variance is given by (84). Finally, because the Jeffreys' prior does not depend on a parameter, the update for x is given by (64) with $\sigma^2$ replaced by $\sigma^{2(m)}$ in (84).

Fourth Prior Probability Function: Butterworth Prior

Figure 7:
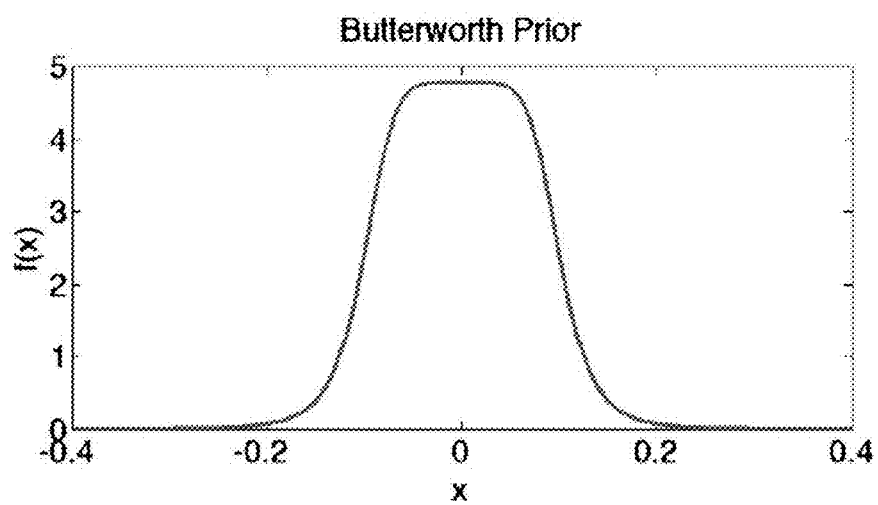
FIG. 7 comprises a graph illustrating a Butterworth prior density function as configured in accordance with various embodiments of the invention.

In this approach, we present a novel density function, known as the Butterworth density function, which can be used to incorporate the sparsity assumption. The Butterworth density function is defined to be $$f_{BW}(a; \epsilon) \triangleq \frac{k_n(\epsilon)}{1 + \left(\frac{a}{\epsilon}\right)^{2n}} \quad (87)$$

where $$k_n(\epsilon) \triangleq \left[\int_{-\infty}^{\infty} \frac{1}{1 + \left(\frac{a}{\epsilon}\right)^{2n}} da\right]^{-1} \quad (88)$$

is a normalization factor, and $\epsilon$ and n are parameters that control the width and decay rate of the density function, respectively. FIG. 7 illustrates a plot of the Butterworth density function for $\epsilon=0.1$ and n=3. One should observe that for large n the Butterworth density function approximates the uniform distribution and $$k_n(\epsilon) \approx \frac{1}{2\epsilon}.$$

It should also be noted that we fix the parameter n for our application so we do not explicitly include it in the notation for the Butterworth density function. With the Butterworth density function, the negative log prior becomes $$\phi_2(x) \triangleq -\log \prod_{l=1}^{L} f_{BW}(x_l; \epsilon) \quad (89)$$

MAP Approach for Butterworth Prior

A MAP algorithm using the Butterworth density function as the prior density function is developed as follows.

The MAP algorithms we have developed are based on the majorize-minimize (MM) methodology so we now introduce this concept. An MM algorithm reduces an objective function by iteratively minimizing a carefully chosen majorizing function. Let $f$ be a function to be minimized within some domain $D \subset \mathbb{R}^L$. A real valued function g is said to be a majorizing function for $f$ at the point $y \in D$ if $$g(x,y) \geq f(x), \forall x, y \in D \quad (90)$$

$$g(y,y) = f(y), \forall y \in D \quad (91)$$

If we succeed in obtaining a majorizing function for $f$, then the associated MM algorithm for minimizing $f$ is given by $$x^{(m+1)} = \arg\min_{x \in D} g(x, x^{(m)}). \tag{92}$$

From (90) and (91), it follows that $$f(x^{(m+1)}) \leq g(x^{(m+1)}, x^{(m)}) \leq g(x^{(m)}, x^{(m)}) = f(x^{(m)}) \tag{93}$$

where the second inequality follows from (92). This implies that the iterates monotonically decrease the function $f$ as the iteration number increases.

Recall the negative MAP objective function is given by $$\phi(x) \triangleq \frac{K}{2}\log(\sigma^2) + \frac{1}{2\sigma^2}\phi_1(x) + \phi_2(x) \tag{94}$$

Note that if we find functions $q_1(\bullet; y)$ and $q_2(\bullet; y)$ that are majorizing functions for $\varphi_1$ and $\varphi_2$, respectively, where $y \in \mathbb{R}^L$, then $$q(x; y) \triangleq \frac{K}{2}\log(\sigma^2) + \frac{1}{2\sigma^2}q_1(x; y) + q_2(x; y) \tag{95}$$

is a majorizing function for $\varphi$ about the point y. In this case, the associated MM algorithm is given by $$x^{(m+1)} = \arg\min_x q(x; x^{(m)}) \tag{96}$$

Now we must determine majorizing functions $q_1(\bullet; y)$ and $q_2(\bullet; y)$. As noted above, De Pierro constructed a majorizing function for linear least-squares objective functions such as $\varphi_1$. We now summarize his result for the Butterworth prior. First, we rewrite the least-squares objective function as $$\phi_1(x) = \sum_{k=1}^{K} (y_k^2 - 2[Ax]_k y_k + ([Ax]_k)^2) \tag{97}$$

where $y_k$ is the $k^{th}$ component of y. We can obtain a majorizing function for $\varphi_1$ by first finding a majorizing function for $([Ax]_k)^2$, where $[Ax]_k$ is the $k^{th}$ element of the vector Ax. The term $([Ax]_k)^2$ can be written as $$([Ax]_k)^2 \triangleq \left(\sum_{l=1}^{L} A_{kl} x_l\right)^2 \tag{98}$$

$$= \left(\sum_{l=1}^{L} \lambda_{kl}\left(\frac{1}{\lambda_{kl}}A_{kl}x_l - \frac{1}{\lambda_{kl}}A_{kl}x_l^{(m)} + [Ax^{(m)}]_k\right)\right)^2$$

where $$\lambda_{kl} \triangleq \begin{cases} \frac{1}{n_k} & \text{for all } A_{kl} \neq 0; \\ 0 & \text{o.w.} \end{cases} \tag{99}$$

$$n_k \triangleq \text{number of nonzero elements in row } k \tag{100}$$

Note that $$\sum_{l=1}^{L} \lambda_{kl} = 1$$

for all k and $\lambda_{kl} \geq 0$ for all k, l. Therefore, by convexity of the square function, $$([Ax]_k)^2 \leq r(x; x^{(m)}) \tag{101}$$

where $$r(x; x^{(m)}) \triangleq \sum_{l=1}^{L} \lambda_{kl}\left(\frac{1}{\lambda_{kl}}A_{kl}x_l - \frac{1}{\lambda_{kl}}A_{kl}x_l^{(m)} + [Ax^{(m)}]_k\right)^2 \tag{102}$$

It is easy to see that $r(x^{(m)}; x^{(m)}) = ([Ax^{(m)}]_k)^2$. Thus, $r(\bullet; x^{(m)})$ is a majorizing function for $([Ax]_k)^2$. If we replace $([Ax]_k)^2$ by $r(x; x^{(m)})$ in (97), we obtain the desired majorizing function for the least-squares objective function $$q_1(x; x^{(m)}) \triangleq \sum_{k=1}^{K} (y_k^2 - 2[Ax]_k y_k + r(x; x^{(m)})) \tag{103}$$

We now turn to the problem of finding a majorizing function for $\varphi_2$, which we now write as $$\phi_2(x) \triangleq -\log\prod_{l=1}^{L} f_{BW}(x_l; \epsilon) = \sum_{l=1}^{L} g(x_l; \epsilon) \tag{104}$$

where $g(a; \epsilon) \triangleq -\log f_{BW}(a; \epsilon)$. As discussed above, de Leeuw and Lange showed that for a univariate function p, the function on $\mathbb{R}^2$ $$h(x, y) \triangleq p(y) + p'(y)(x - y) + \frac{C}{2}(x - y)^2 \tag{105}$$

majorizes p at y, provided p is twice differentiable and C>0 is an upper bound for p''. We now use this "Taylor series" expansion method to obtain a majorizing function for $\varphi_2$. Replacing the function g in (104) by its Taylor series majorizing function results in the following majorizing function for $\varphi_2$ at $x^{(m)}$ $$q_2(x; x^{(m)}) \triangleq \sum_{l=1}^{L} \left[g(x_l^{(m)}; \epsilon) + g'(x_l^{(m)}; \epsilon)(x_l - x_l^{(m)}) + \frac{B}{2}(x_l - x_l^{(m)})^2\right] \tag{106}$$

where, in this case, B is the least upper bound of the second derivative of $g(\bullet; \epsilon)$. This choice for B guarantees the optimality of the majorizing function $q_2$. Observe that $q_2(x; x^{(m)}) = \varphi_2(x^{(m)})$ when $x = x^{(m)}$.

From (95), (103), and (106), we have the following majorizing function for the MAP objective function $$q(x; x^{(m)}) = \frac{K}{2}\log(\sigma^2) + \frac{1}{2\sigma^2}\sum_{k=1}^{K}(y_k^2 - 2y_k[Ak]_k + r(x; x^{(m)})) + q_2(x; x^{(m)}) \quad (107)$$

Recall that we can obtain an algorithm for minimizing the MAP objective function using (92). Taking the derivative of $q(x; x^{(m)})$ with respect to $x_l$ and setting the result to zero produces the desired MAP algorithm. The derivative of $q(x; x^{(m)})$ with respect to $x_l$ equals $$\frac{\partial q(x; x^{(m)})}{\partial x_l} = \quad (108)$$

$$-\frac{1}{\sigma^2}\sum_{k=1}^{K}(y_k A_{kl} - A_{kl}[n_k A_{kl} x_l - n_k A_{kl} x_l^{(m)} + [Ax^{(m)}]_k]) + \frac{\partial q_2(x; x^{(m)})}{\partial x_l}$$

where $$\frac{\partial q_2(x; x^{(m)})}{\partial x_l} = g'(x_l^{(m)}; \epsilon) + B(x_l - x_l^{(m)}) \quad (109)$$

Setting this derivative to zero yields the following MAP algorithm for reconstructing images from GPR data $$x_l^{(m+1)} = x_l^{(m)} + \frac{G_l^{(m)} - \sigma^2 \cdot g'(x_l^{(m)}; \epsilon)}{\sigma^2 \cdot B + H_l} \quad (110)$$

where $$H_l \triangleq \sum_{k=0}^{K-1} r_k A_{kl}^2 \quad (111)$$

$$G_l^{(m)} \triangleq \sum_{k=0}^{K-1} A_{kl}(y_k - [Ax^{(m)}]_k) \quad (112)$$

$$g'(x_l^{(m)}; \epsilon) \triangleq \frac{2n\left(\frac{x_l^{(m)}}{\epsilon}\right)^{2n-1}}{\epsilon\left(1 + \left(\frac{x_l^{(m)}}{\epsilon}\right)^{2n}\right)} \quad (113)$$

Using the particular structure of the GPR data model, the quantities $H_l$ and $G_l^{(m)}$ can be computed efficiently using fast implementations as described below and developed in U.S. patent application Ser. No. 14/184,446 filed Feb. 19, 2014, published as U.S. Pat. App. Pub. No. 2015/0279082, which is incorporated by reference herein.

Automatic Selection of Noise Variance and Prior Parameter

For the Butterworth Prior

The noise variance $\sigma^2$ and prior parameter $\in$ quantities are typically unknown in practical applications. In this section, we develop a method to adaptively estimate and update the unknown noise variance $\sigma^2$ and the unknown Butterworth parameter $\in$. First, we modify the notation to account for the fact that the MAP objective function and majorizing function explicitly depend on $\in$ and $\sigma^2$. Thus, $\varphi(x)$, $\varphi_2(x)$, $q(x; x^{(m)})$, and $q_2(x; x^{(m)})$ are now expressed as $\varphi(x, \in, \sigma^2)$, $\varphi_2(x, \in)$, $q(x, \in, \sigma^2; x^{(m)})$, and $q_2(x, \in; x^{(m)})$, respectively. (Although technically incorrect, we will refer to the quantities $\varphi(x, \in, \sigma^2)$, $\varphi_2(x, \in)$, $q(x, \in, \sigma^2; x^{(m)})$, and $q_2(x, \in; x^{(m)})$ as functions in order to simplify the discussion.) The cyclic optimization method given below could in principle be used to jointly estimate the reflectance coefficient vector, x, noise variance, $\sigma^2$, and Butterworth prior parameter, $\in$.

for m=0, 1, . . . , niter do $$x^{(m+1)} = \underset{x}{\operatorname{argmin}} \, \phi(x, \epsilon^{(m)}, \sigma^{2(m)}) \quad (114)$$

$$\epsilon^{(m+1)} = \underset{\epsilon>0}{\operatorname{argmin}} \, \phi(x^{(m+1)}, \epsilon, \sigma^{2(m)}) \quad (115)$$

$$\sigma^{2(m+1)} = \underset{\sigma^2>0}{\operatorname{argmin}} \, \phi(x^{(m+1)}, \epsilon^{(m+1)}, \sigma^2) \quad (116)$$

end for

Instead of solving the minimization problem in (114) it will be convenient to find an iterate $x^{(m+1)}$ that decreases the MAP objective function $\varphi(x, \in, \sigma^2)$ in the following sense $$\varphi(x^{(m+1)}, \in^{(m)}, \sigma^{2(m)}) \leq \varphi(x^{(m)}, \in^{(m)}, \sigma^{2(m)}) \quad (117)$$

Taking into account the discussion above, an iterate that satisfies (117) can be found by minimizing the majorizing function $q(x, \in^{(m)}, \sigma^2(m); x^{(m)})$ (i.e., (107)) with $\in$ and $\sigma^2$ replaced with $\in^{(m)}$ and $\sigma^{2(m)}$, respectively. Thus, a solution to (114) is $$x^{(m+1)} \triangleq \underset{x}{\operatorname{argmin}} \, q(x, \epsilon^{(m)}, \sigma^{2(m)}; x^{(m)}) \quad (118)$$

The minimization problem in (115) is solved using a one-dimensional line search such as the golden section search method. Implicitly, we have assumed that an interval can be determined that contains the minimizer of $\varphi(x^{(m+1)}, \in, \sigma^{2(m)})$. Finally, we estimate the noise power by obtaining a closed form expression for the minimizer of $\varphi(x^{(m+1)}, \in^{(m+1)}, \sigma^2)$. An alternative to the algorithm defined by (114)-(116) is summarized below for m=0, 1, . . . , niter do $$x^{(m+1)} = \underset{x}{\operatorname{argmin}} \, q(x, \epsilon^{(m)}, \sigma^{2(m)}; x^{(m)}) \quad (119)$$

$$\epsilon^{(m+1)} = \underset{\epsilon_l \leq \epsilon \leq \epsilon_k}{\operatorname{arg\,min}} \, \phi(x^{(m+1)}, \epsilon, \sigma^{2(m)}) \quad (120)$$

$$\sigma^{2(m+1)} = \underset{\sigma^2}{\operatorname{argmin}} \, \frac{K}{2}\log \sigma^2 + \frac{1}{2\sigma^2}\phi_1(x^{(m+1)}) \quad (121)$$

end for where the solution of (120) is assumed to lie within the interval $[\in_l, \in_k]$.

We will now show that the cyclic minimization algorithm defined by (119)-(121) is guaranteed to monotonically decrease the MAP objective function $\varphi(x, \in, \sigma^2)$. From (114) and (119), it follows that $\varphi(x^{(m)}, \in^{(m)}, \sigma^{2(m)}) \geq \varphi(x^{(m+1)}, \in^{(m)}, \sigma^{2(m)})$. Also, (120) implies that $\varphi(x^{(m+1)}, \in^{(m)}, \sigma^{2(m)}) \geq \varphi(x^{(m+1)}, \in^{(m+1)}, \sigma^{2(m)})$. Finally, it can be observed from (121) that $\varphi(x^{(m+1)}, \in^{(m+1)}, \sigma^{2(m)}) \geq \varphi(x^{(m+1)}, \in^{(m+1)}, \sigma^{2(m+1)})$. Therefore, $$\varphi(x^{(m)}, \in^{(m)}, \sigma^{2(m)}) \geq \varphi(x^{(m+1)}, \in^{(m+1)}, \sigma^{2(m+1)}) \quad (122)$$

Thus, the iterates obtained from the cyclic minimization technique described above are guaranteed to monotonically decrease the objective function $\varphi(x, \in, \sigma^2)$. The solution to (119) was discussed above and is given by (110) with $\in$ and $\sigma^2$ replaced by $\in^{(m)}$ and $\sigma^{2(m)}$ respectively $$x_l^{(m+1)} = x_l^{(m)} + \frac{G_l^{(m)} - \sigma^{2(m)} \cdot g'(x_l^{(m)}; \epsilon)}{\sigma^{2(m)} \cdot B + H_l} \quad (123)$$

To obtain the estimate for the noise power, we set the derivative of $\varphi(x^{(m+1)}, \in^{(m+1)}, \sigma^2)$ with respect to $\sigma^2$ to zero and solve the resulting equation. The derivative of $\varphi(x^{(m+1)}, \in^{(m+1)}, \sigma^2)$ with respect to $\sigma^2$ equals $$\frac{\partial \phi(x^{(m+1)}, \epsilon^{(m+1)}, \sigma^2)}{\partial \sigma^2} = \frac{K}{2\sigma^2} - \frac{1}{2(\sigma^2)^2} \|y - Ax^{(m+1)}\|_2^2 \quad (124)$$

Setting this derivative to zero yields the maximum likelihood estimate of the noise power $$\sigma^{2(m+1)} = \frac{1}{K} \|y - Ax^{(m+1)}\|_2^2 \quad (125)$$

Given the single Butterworth prior for the reflectance coefficients, where the noise power and the Butterworth parameter are unknown, the implementation of the above MM-based MAP algorithm, which we call Algorithm I, is now outlined ---
Algorithm I:

Initialization:
    Obtain initial estimates $x^{(0)}, \in^{(0)}$, and $\sigma^{(0)}$ and set the value for the parameter n
    Compute B numerically
Iteration:
    for m = 0,1,...,niter do
        for l = 1,2,...,L do
            Compute $g'(x_l^{(m)};\in^{(m)})$ from equation (113), Compute $x_l^{(m+1)}$ from equation (123)
        end for
        Compute $\in^{(m+1)}$ from equation (120) using a line search
        Compute $\sigma^{2(m+1)}$ from equation (125)
    end for
--- where niter is the chosen number of iterations.

Description of the Fast Implementation

When applied in a typical GPR context, the computation of the term $G_l^{(m)}$ requires the K×L matrix A where K=IJN. For the above described UWB SIRE radar system, these parameters are I=43 transmit locations, J=16 receive antennas, N=1350 data samples per return-profile, and L=25000 pixels.

These parameter settings require 173 gigabytes (GB) of memory to merely store the system matrix A. Because A has many zero-elements, however, the data could be more efficiently stored as a sparse matrix. Nevertheless, a sparse representation for A would still require approximately 16 GB of memory. With such a large memory size requirement, the construction of the A matrix in the current formulation of the algorithm is not feasible or practical for typical computing platforms, especially in field deployment where on site imaging would be advantageous. Indeed, virtually any other GPR image formation method that requires explicitly constructing the system matrix would have comparable requirements.

In addition to memory size challenges, computational cost would also be an issue for the current format of the MM-based $l_1$-LS algorithm. At each iteration, the computation of $G_l^{(m)}$ would require the matrix multiplication $Ax^{(m)}$, which has $\mathcal{O}$ (KL) time complexity. This operation is thus not practical for large-scale implementations where the parameters K and L are expected to be relatively large. For example, in our case, we have K=27520 and L=25000. Additional costs include the computation of the term $H_l$ where the number of non-zero elements in each of the K rows of A is needed. To arrive at a fast and memory-efficient implementation of the above algorithms, the following acceleration techniques may be implemented.

Fast Implementation of $G_l^{(m)}$

In a GPR context, the mathematical expressions at equations (111) and (112) above can be modified to reduce processing time and required memory by accounting for a symmetric nature of a given radar pulse, accounting for similar discrete time delays between transmission of a given radar pulse and reception of reflections from the given radar pulse, and accounting for a short duration of the given radar pulse. Accordingly, the equation for determining estimates for values x representing reflectance coefficients of the objects in the SOI, involves calculation of the terms $G_l^{(m)}$ and $H_l$, which calculation can be streamlined according to the above assumptions. In application, a processing device is configured to calculate terms used to obtain the estimated value. Pursuant to these aspects, the expression for $G_l^{(m)}$ in (112) can be written as $$G_l^{(m)} = \sum_{i=1}^{I} \sum_{j=1}^{J} \sum_{n=0}^{N-1} \alpha_{ijl} \cdot p(nT_s - \tau_{ijl}) \cdot g_{ij}^{(m)}(nT_s) \quad (126)$$

where, for n=0, 1, . . . , N−1, $$g_{ij}^{(m)}(nT_s) = y_{ij}[n] - \sum_{l=1}^{L} \alpha_{ijl} \cdot x_l^{(m)} \cdot p(nT_s - \tau_{ijl}). \quad (127)$$

To facilitate a fast implementation, we approximate the quantity $G_l^{(m)}$ by $$\hat{G}_l^{(m)} \triangleq \sum_{i=1}^{I} \sum_{j=1}^{J} \sum_{n=0}^{N-1} \alpha_{ijl} \cdot p(nT_s - n_{ijl}T_s) \cdot \hat{g}_{ij}^{(m)}(nT_s), \quad (128)$$

where $$n_{ijl} \triangleq \text{round}\left(\frac{\tau_{ijl}}{T_s}\right) \quad (129)$$

$$\hat{g}_{ij}^{(m)}(nT_s) \triangleq y_{ij}[n] - \hat{s}_{ij}^{(m)}(nT_s) \quad (130)$$

$$\hat{s}_{ij}^{(m)}(nT_s) \triangleq \sum_{l=1}^{L} \alpha_{ijl} \cdot x_l^{(m)} \cdot p(nT_s - n_{ijl}T_s). \quad (131)$$

We will refer to the set of values $\{n_{ijl}\}$ as the discrete-time delays. We can write $\hat{G}_l^{(m)}$ as $$\hat{G}_l^{(m)} = \sum_{i=1}^{I} \sum_{j=1}^{J} \alpha_{ijl} \cdot \hat{G}_{ijl}^{(m)} \qquad (132)$$

where $$\hat{G}_{ijl}^{(m)} = \sum_{n=0}^{N-1} p(nT_s - n_{ijl}T_s) \cdot \hat{g}_{ij}^{(m)}(nT_s) \qquad (133)$$

$$= \sum_{n=0}^{N-1} w[n - n_{ijl}] \cdot \hat{g}_{ij}^{(m)}[n] \qquad (134)$$

$$= \left\{ \sum_{n=0}^{N-1} w[n-k] \hat{g}_{ij}^{(m)}[n] \right\}_{k=n_{ijl}} \qquad (135)$$

with $w[n] \triangleq p(nT_s)$. Because the transmitted pulse $p(t)$ is symmetric, $w[n-k]=w[k-n]$ holds for all n and k, and thus $$\hat{G}_{ijl}^{(m)} = \left\{ \sum_{n=0}^{N-1} w[n-k] \hat{g}_{ij}^{(m)}[n] \right\}_{k=n_{ijl}} \qquad (136)$$

$$= \{(w * \hat{g}_{ij}^{(m)})[k]\}|_{k=n_{ijl}} \qquad (137)$$

$$= \{(w * (y_{ij} - \hat{s}_{ij}^{(m)}))[k]\}|_{k=n_{ijl}}. \qquad (138)$$

It is readily observed that computing $\hat{G}_{ijl}^{(m)}$ requires the convolution of the discrete pulse $w[n]$ with the $m^{th}$ iteration of the error-term sequence $(y_{ij}[n]-\hat{s}_{ij}^{(m)}[n])$. The sequences $w[n]$ and $y_{ij}[n]$ are given. Hence, to efficiently compute $\hat{G}_{ijl}^{(m)}$, a computationally efficient way for generating the sequence $\hat{s}_{ij}^{(m)}[n]$ is needed.

First, we note that the collection of discrete-time delays $\{n_{ijl}\}$ is expected to have repeated values. Let $k_{min}$ and $k_{max}$ denote respectively the minimum and maximum discrete-time delays. The sifting property of the unit impulse function can be used to write $$\hat{s}_{ij}^{(m)}[n] = \sum_{k=k_{min}}^{k_{max}} \left\{ \sum_{l=1}^{L} \alpha_{ijl} \cdot x_l^{(m)} \cdot w[n-n_{ijl}] \cdot \delta[k-n_{ijl}] \right\} \qquad (139)$$

$$= \sum_{k=k_{min}}^{k_{max}} \left\{ \sum_{l=1}^{L} \alpha_{ijl} \cdot x_l^{(m)} \cdot w[n-k] \cdot \delta[k-n_{ijl}] \right\} \qquad (140)$$

$$= \sum_{k=k_{min}}^{k_{max}} \left\{ \sum_{l=1}^{L} \alpha_{ijl} \cdot x_l^{(m)} \cdot \delta[k-n_{ijl}] \right\} w[n-k] \qquad (141)$$

$$= \sum_{k=k_{min}}^{k_{max}} q_{ij}[k] \cdot w[n-k] \qquad (142)$$

$$= (q_{ij} * w)[n] \qquad (143)$$

where $$q_{ij}[k] \triangleq \sum_{l=1}^{L} \alpha_{ijl} \cdot x_l^{(m)} \cdot \delta[k-n_{ijl}]. \qquad (144)$$

The term $q_{ij}[k]$ can then be expressed as $$q_{ij}[k] \triangleq \sum_{l \in S_k} d_{ijl}^{(m)} \qquad (145)$$

where $d_{ijl}^{(m)} = \alpha_{ijl} \cdot x_l^{(m)}$ and $S_k = \{l=1, 2, \ldots, L: n_{ijl}=k\}$.

In other words, the term $q_{ij}[k]$ is computed by accumulating all elements of $$d_{ijl}^{(m)} = [d_{ij1}^{(m)}, d_{ij2}^{(m)}, \ldots, d_{ijL}^{(m)}] \qquad (146)$$

for which associated discrete-time delay indexes $n_{ijl}$ have the same integer value k. Consequently, $q_{ij}[k]$ can then be computed in a very efficient manner using the hash table data structure concept. The indexes of a hash table, typically referred to as keys, are the integers between $k_{min}$ and $k_{max}$, and the record associated with the $k^{th}$ key is the set of values $$\{d_{ijl}^{(m)}; l=1, 2, \ldots, L; n_{ijl}=k\}. \qquad (147)$$

By one approach, the hash-table-based computation of $q_{ij}[k]$ is implemented using a processing device configured to use MATLAB using the accumarray function. The variables d, n and q store the following sequences:

$$d \leftarrow d_{ijl}^{(m)} = [d_{ij1}^{(m)}, d_{ij2}^{(m)}, \ldots, d_{ijL}^{(m)},] \qquad (148)$$

$$n \leftarrow n_{ijl} = [n_{ij1}, n_{ij2}, \ldots, n_{ijL}] \qquad (149)$$

$$q \leftarrow q_{ij} = [q_{ij}[1], q_{ij}[2], \ldots, q_{ij}[k_{max}]] \qquad (150)$$

The variable q is computed via the command q=accumarray (n, d) where $k_{min} \leq n_{ijl} \leq k_{max}$ for all l, $q_{ij}[k]=0$ for all indexes $k<k_{min}$. An example of pseudocode to be run by the processing device for implementation of the proposed algorithm for efficiently computing $G_l^{(m)}$ is given below.

Subroutine 1: Pseudocode for computing $G_l^{(m)}$ for $l=1, 2, \ldots, L$

```
for i = 1, 2, ..., I do
    for j = 1, 2, ..., J do
        SET q_ij[k] = 0 for 0 ≤ k < k_min
        for k = k_min, k_min + 1, ..., k_max do
            S_k = {l = 1, 2, ..., L:n_ijl = k}
            q_ij[k] = Σ_{l∈S_k} d_ijl^(m)  (hash-table-implementation)
        end for
        ŝ_ij^(m)[n] = (q_ij * w)[n]
        for l = 1, 2, ..., L do
            Ĝ_ijl^(m) = {(w * (y_ij - s_ij(m)))[k]}|_{k=n_ijl}
        end for
    end for
end for Ĝ_l^(m) = Σ_{i=1}^{I} Σ_{j=1}^{J} α_ijl · Ĝ_ijl^(m)
```

In addition to being more computationally efficient, the proposed implementation does not require constructing the large system matrix A. A tangible benefit of this fact is the size of data (i.e., the number of transmit locations) that can be used to form an image is no longer limited. It is also readily observed from the pseudocode that the computation of $\hat{G}_l^{(m)}$ is parallelizable such that faster processing techniques such as parallel or GPU based processing can be used to process the data.

Fast Implementation of $H_l$

An alternative expression for $H_l$ in (111) is $$H_l = \sum_{i=1}^{I} \sum_{j=1}^{J} \sum_{n=1}^{N} (\alpha_{ijl})^2 \cdot r_{ijn} \cdot \beta(nT_s - \tau_{ijl}), \quad (151)$$

where $\beta(t) \triangleq p^2(t)$ and $r_{ijn}$ is the number of non-zero elements in the $n^{th}$ row of the N×L sub-matrix $A_{ij} = P_{ij} D_{ij}$. To facilitate a fast implementation, we approximate the quantity $H_l$ by $$\hat{H}_l = \sum_{i=1}^{I} \sum_{j=1}^{J} \sum_{n=1}^{N} (\alpha_{ijl})^2 \cdot r_{ijn} \cdot \beta(nT_s - n_{ijl}T_s), \quad (152)$$

We write $\hat{H}_l$ as $$\hat{H}_l = \sum_{i=1}^{I} \sum_{j=1}^{J} (\alpha_{ijl})^2 \cdot \hat{H}_{ijl} \quad (153)$$

where $$\hat{H}_{ijl} = \sum_{n=0}^{N-1} r_{ijn} \cdot \beta(nT_s - n_{ijl}T_s) \quad (154)$$

$$= \sum_{n=0}^{N-1} \gamma_{ij}[n] \cdot h[n - n_{ijl}] \quad (155)$$

$$= \left\{ \sum_{n=0}^{N-1} \gamma_{ij}[n] \cdot h[n - k] \right\}\bigg|_{k=n_{ijl}} \quad (156)$$

$$= \left\{ \sum_{n=0}^{N-1} \gamma_{ij}[n] \cdot h[k - n] \right\}\bigg|_{k=n_{ijl}} \quad (157)$$

$$= \{(\gamma_{ij} * h)[k]\}|_{k=n_{ijl}} \quad (158)$$

with $h[n] \triangleq \beta(nT_s)$, and $r_{ijn}$ is now represented by the n-indexed sequence $\gamma_{ij}[n] \triangleq r_{ijn}$. For the sake of convenience and consistency, we assume here that rows of a matrix are counted starting from a zeroth row. The computation $\hat{H}_{ijl}$ requires the convolution of the squared and discretized pulse $h[n]$ with the sequence $\gamma_{ij}[n]$. The computation of $\hat{H}_{ijl}$ is significantly accelerated with the introduction of a fast procedure for generating $\gamma_{ij}[n]$.

First, we recall that the sample $\gamma_{ij}[n]$ is the number of non-zeros entries in the $n^{th}$ row of the N×L sub-matrix $A_{ij}$. Because the radar system has an ultra wide band, the transmitted pulse $p(t)$ is short. Consequently, the samples of the length-N sequence $w[n]$ are zero (or practically zero) for indexes n such that $|n| < M$ and non-zero, otherwise. The parameter M is even and significantly smaller than N. The $l^{th}$ column of $A_{ij}$ coincides with the length-N vector $$[\alpha_{ijl} p(0-\tau_{ijl}), \alpha_{ijl} p(T_s - \tau_{ijl}), \ldots, \alpha_{ijl} p((N-1)T_s - \tau_{ijl})]^T. \quad (159)$$

The (n, l)-entry of $A_{ij}$ is thus non-zero if $$|nT_s - \tau_{ijl}| \leq MT_s. \quad (160)$$

Using (129), the above rule in (160) can be approximated by $$|n - n_{ijl}| \leq M. \quad (161)$$

A computed delay index $n_{ijl}$ is such that $0 \leq n_{ijl} \leq N$. Consequently, for computational convenience, we write that the (n, l)-entry of $A_{ij}$ is non-zero if $$\max(0, n-M) \leq n_{ijl} \leq \min(n+M, N). \quad (162)$$

The number $\gamma_{ij}[n]$ of non-zeros entries in the $n^{th}$ row of $A_{ij}$ is thus equal to the number of elements in the $n^{th}$ row that satisfy (162). A more convenient definition is $$\gamma_{ij}[n] = |\mathcal{R}_n| \quad (163)$$

where $|\mathcal{R}_n|$ denotes the number of elements in the set $$\mathcal{R}_n = \{l=1,2,\ldots,L | \max(0,n-M) \leq n_{ijl} \leq \min(n+M,N)\}. \quad (164)$$

The parameter $\gamma_{ij}[n]$ can be efficiently computed by taking advantage of the hash-table-based fast implementation concept used in (145). First, we write $$\gamma_{ij}[n] = |\mathcal{R}_n^+| - |\mathcal{R}_n^-| \quad (165)$$

where $$\mathcal{R}_n^+ = \{l=1,2,\ldots,L | n_{ijl} \leq \min(n+M,N)\} \quad (166)$$

$$\mathcal{R}_n^- = \{l=1,2,\ldots,L | n_{ijl} \leq \min(0, n-M-1)\}. \quad (167)$$

The expression in (165) is further expanded as $$\gamma_{ij}[n] = \sum_{k=0}^{\min(n+M,N)} |S_k| - \sum_{k=0}^{\max(0,n-M)} |S_k| \quad (168)$$

Finally, we have $$\gamma_{ij}[n] = v[\min(n + M, N)] - v[\max(0, n - M)] \quad (169)$$

where $$v[m] = \sum_{k=0}^{m} |S_k| \quad (170)$$

with $S_k = \{l=1, 2, \ldots, L: n_{ijl} = k\}$. The inner summation in (170) (and, hence the computation of $v[m]$) is efficiently computed using the hash-table-based fast implementation previously discussed and used in (145). Example pseudo-code to be run by the processing device for implementation of the proposed algorithm for efficiently computing $H_1$ is given below.

Subroutine 2: Pseudocode for computing $H_l$ for $l=1, 2, \ldots, L$

```
for i = 1, 2, ..., I do
    for j = 1, 2, ..., J do
        SET q[k] = 0 for 0 ≤ k < k_min
        for k = k_min, k_min + 1, ..., k_max do
            S_k = {l = 1, 2, ..., L:n_{ijl} = k}
            q[k] = |S_k| (hash-table-implementation)
        end for
        for m = 0, 1, ..., N do
            v[m] = ∑_{k=0}^{m} q[k]
        end for
        for n = 0, 1, ..., N do
            γ_{ij}[n] = w[min(n + M, N)] - w[max(0, n - M)]
        end for
        for l = 1, 2, ..., L do
            Ĥ_{ijl} = {(γ_{ij} * h)[k]}|_{k=n_{ijl}}
        end for
```

-continued

```
end for
end for
```

$$\hat{H}_l = \sum_{i=1}^{I} \sum_{j=1}^{J} (\alpha_{ijl})^2 \cdot \hat{H}_{ijl}$$

Putting together the results for calculating terms $G_l^{(m)}$ and $H_l$, example pseudocode for the $l_1$-LS algorithm follows.

Pseudocode for computing $l_1$-LS algorithm for $m=1, 2, \ldots, \text{num}_{it}$ Initialization: $x^{(0)} = \{x_1^{(0)}, x_2^{(0)}, \ldots, x_L^{(0)}\}$

```
for l = 1, 2, ..., L do
    Compute Ĥ_l (via Subroutine 2)
end for
for m = 1, 2, ..., num_it do
    for l = 1, 2, ..., L do
        Compute Ĝ_l^(m) (via Subroutine 1)
    end for
```

$$x_l^{(m+1)} = \frac{\hat{H}_l \cdot x_l^{(m)} + \hat{G}_l^{(m)}}{\hat{H}_l + \frac{\lambda}{2|x_l^{(m)}|}}$$

```
end for
```

Summary of Results for the Various Approaches

The described MM-based MAP algorithms are applicable to large-scale, real applications. Although the proposed algorithms effectively estimates reflection coefficients of scenes-of-interest using GPR datasets, the algorithms could be readily applied to a variety of applications where datasets are collected using synthetic aperture imaging measurement principles. We have applied our algorithms to simulated and real datasets supplied by ARL. The results obtained using the described MAP algorithms are consistent in the sense that the resulting images, for both simulated and real datasets, have the same characteristics in terms of noise removal and sidelobe reduction. In general, the images generated were sufficiently sparse without a loss of known scatterers. The desirable results obtained using real datasets are even more encouraging because they suggest that our algorithms are robust enough for practical applications.

With respect to the described Butterworth prior used to exploit the known sparsity constraint of scatterers within an SOI, this approach does not require any user input parameters. It can also be observed that the application of the Butterworth prior need not be limited to modeling the distribution of reflectance coefficients. The Butterworth prior is a good approximation for the uniform distribution and can thus be used in other problems that require a uniform distribution model. Moreover, the majorizing functions we developed for the negative log priors are general enough that they can be used in other MM-based MAP methods regardless of the form of the density function for the corresponding problem. Finally, we have improved upon image reconstruction techniques, namely the DAS and RSM algorithms, currently used by ARL for GPR.

The methods described above can be implemented as illustrated in FIG. 8, where a processing device receives 805 a data set and processes 810 the initial data set by creating an estimated image value for individual voxels in the image by iteratively deriving the estimated image value through application of a majorize-minimize technique to solve a maximum a posteriori (MAP) estimation problem having a MAP objection function associated with a mathematical model of image data from the data. These basic steps can be applied to achieve fast and computationally efficiently prepared image using the estimated image value of individual voxels of the image that can be displayed 815, wherein the initial data set may be sourced from a variety of applications where datasets are collected using synthetic aperture imaging measurement principles. In the GPR context, the method may further include emitting 820 a radar pulse at specified intervals into a scene-of-interest and detecting 825 magnitude of signal reflections from the scene of interest from the radar pulse. Position data is recorded 830 corresponding to individual radar pulse emissions and individual receptions of the signal reflections. The initial data set in this application is created 835 from the position data and detected magnitudes of the signal reflections. Where the method is carried out remote from the vehicle, it is sufficient where the receipt of the data to be processed includes receiving data representing transmission site locations of radar pulses, reception site locations of reception of reflections from the radar pulses, radar-return profiles for pairings of the transmission site locations and the reception site locations, and data samples associated with individual radar-return profiles.

Figure 8:
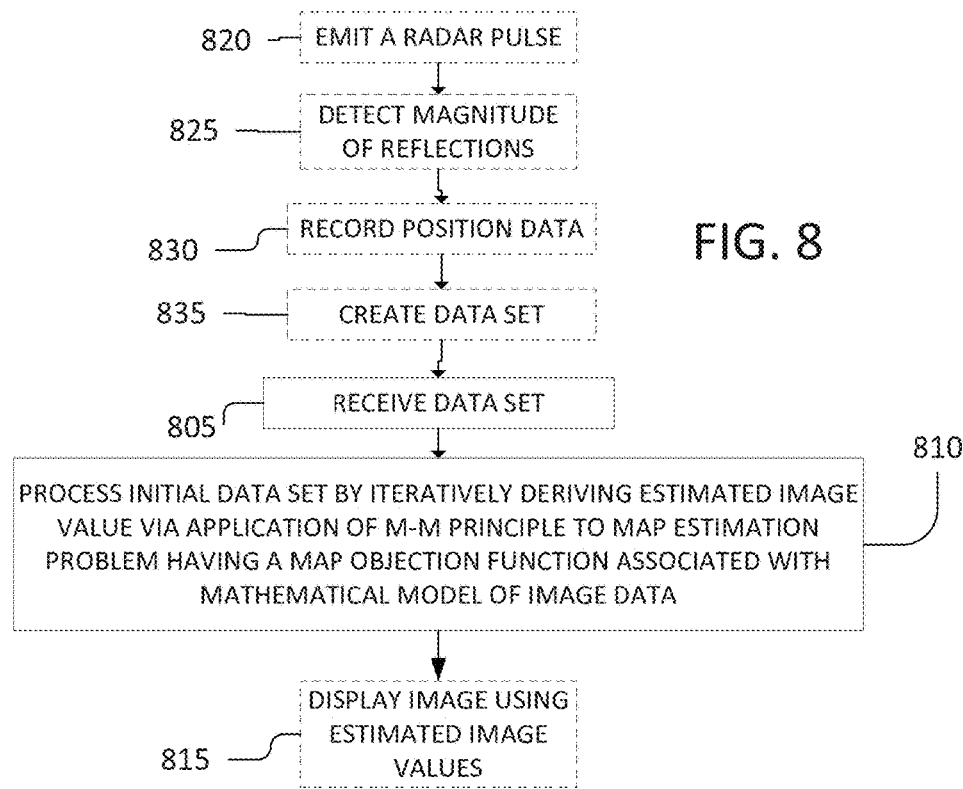
FIG. 8 comprises a flow diagram of an example algorithm applying the M-M principle to a MAP algorithm using various prior density functions as configured in accordance with various embodiments of the invention.

We tested the first described approach to a GPR MAP reconstruction (GMR) algorithm using simulated GPR data that closely mimics the data generated by ARL's SIRE system. FIG. 8 shows the layout of the point-scatterers for the reflectance image.

Figure 9:
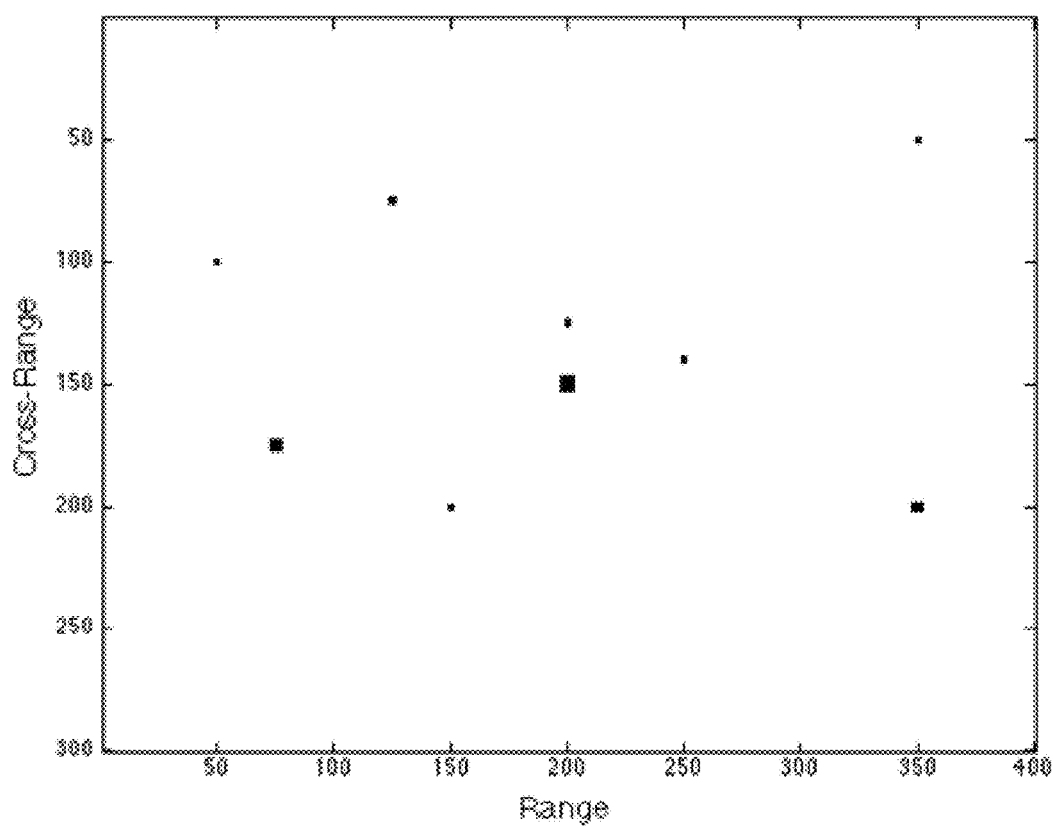
FIG. 9 comprises a graph of simulated GPR data used to evaluate various approaches described herein.

We corrupted the simulated data with white Gaussian noise (WGN). Note that although we assumed the noise is WGN, the noise in practice may differ greatly from this assumption. We compare the images obtained from the GMR and DAS algorithms subjectively, and objectively using the receiver operating curves (ROCs) that result from the Reed-Xiaoli detector. FIG. 9 shows the image obtained using the DAS algorithm. The image has significant side lobes and shadows, and the background noise is clearly visible. By contrast, the image generated by the GMR algorithm (FIG. 10) is sparser and adequately suppress the side lobes and background noise.

Figure 12:
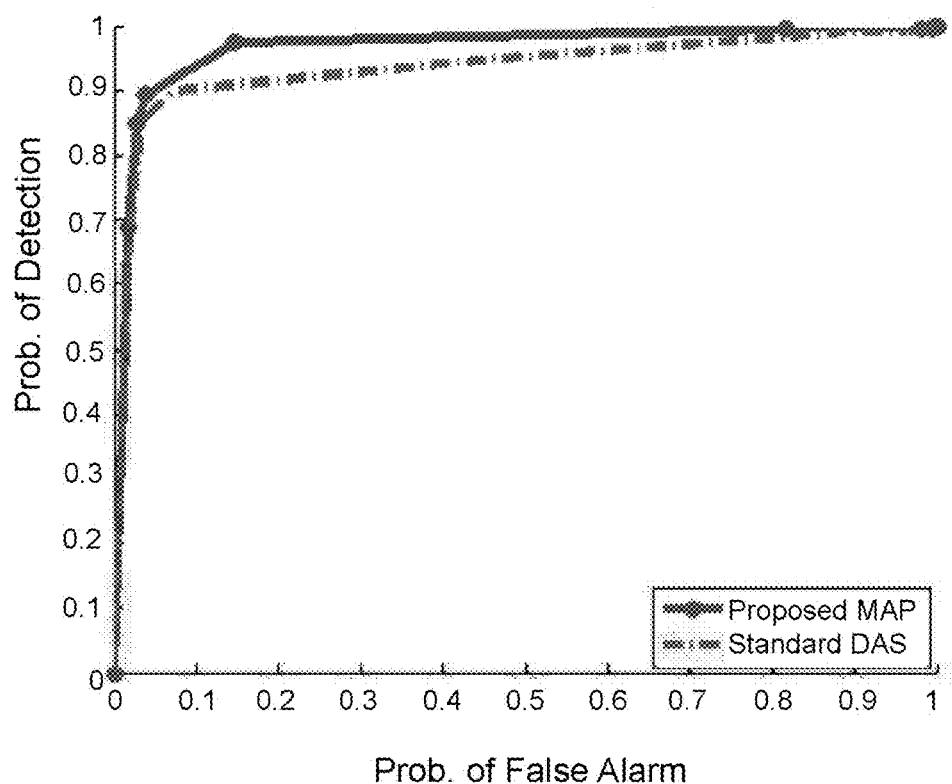
FIG. 12 comprises a graph displaying receiver operating curves for the prior art DAS method and a MAP method described herein as applied, respectively, to create the images of FIGS. 10 and 11.
Figure 13:
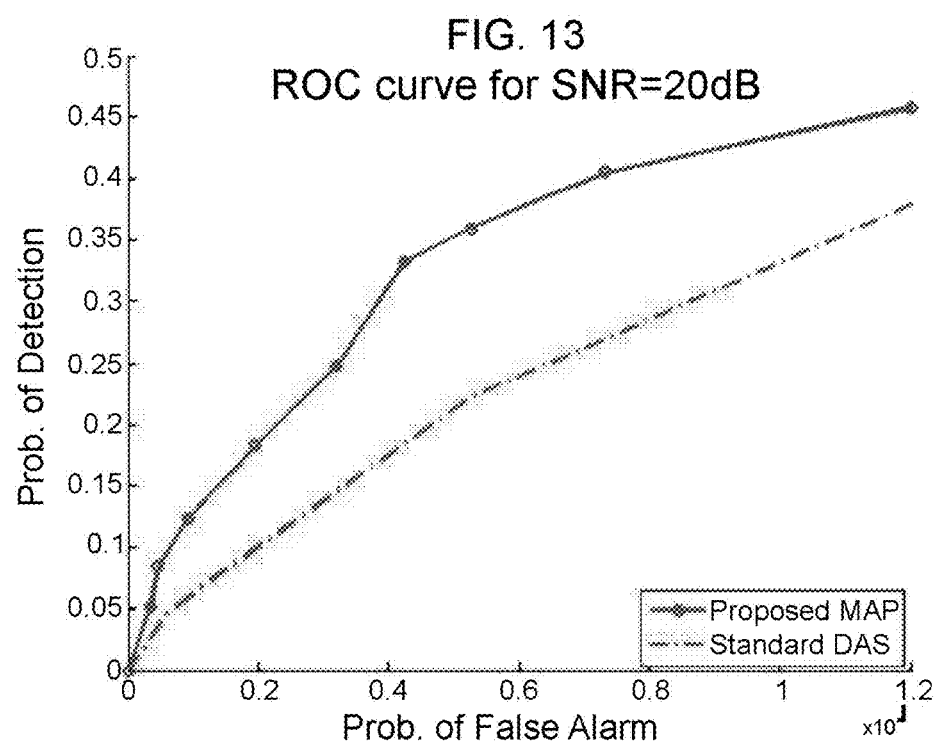
FIG. 13 comprises a graph displaying a zoomed in portion of the graph of FIG. 12.

The ROCs in FIGS. 12 and 13 show that the GMR algorithm suppresses the background noise well enough to provide a better detection rate and a lower false alarm rate than the DAS algorithm. Similar results were obtained for data from ARL. We show only the real data image FIGS. 14 and 15 for brevity.

We also similarly evaluated the performance of the MAP algorithm using the Jeffery's, Laplacian-like, and Laplacian priors using a synthetic GPR dataset. These algorithms are compared to the DAS, RSM and LMM algorithms. The LMM algorithm is a fast algorithm that uses the majorization-minimization technique to solve the $l_1$-regularized least-squares estimation problem (see U.S. patent application Ser. No. 14/245,733 filed Feb. 19, 2014, which is incorporated by reference herein).

Figure 16:
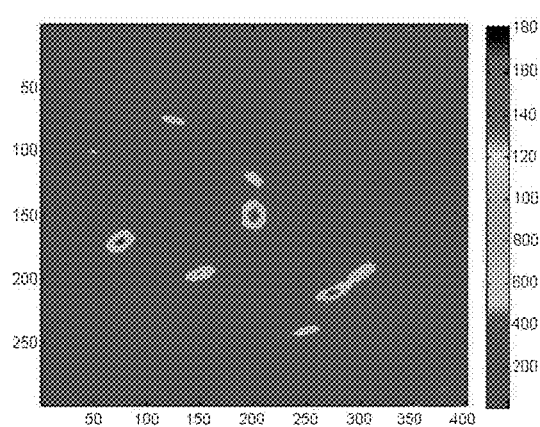
FIG. 16 comprises a displayed image derived from a set of simulated data using a prior art DAS method.
Figure 17:
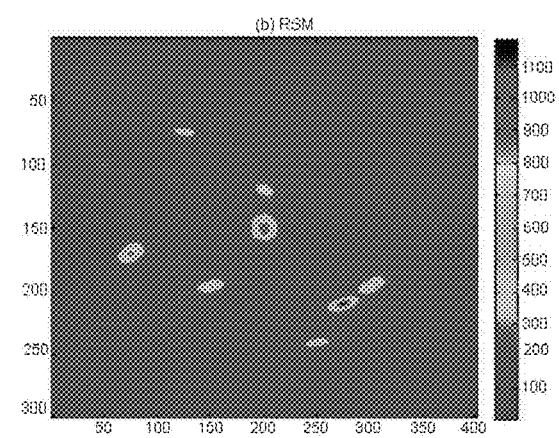
FIG. 17 comprises a displayed image of the objects in the SOI of FIG. 16, in this case using image data processed according to prior art RSM algorithm.
Figure 18:
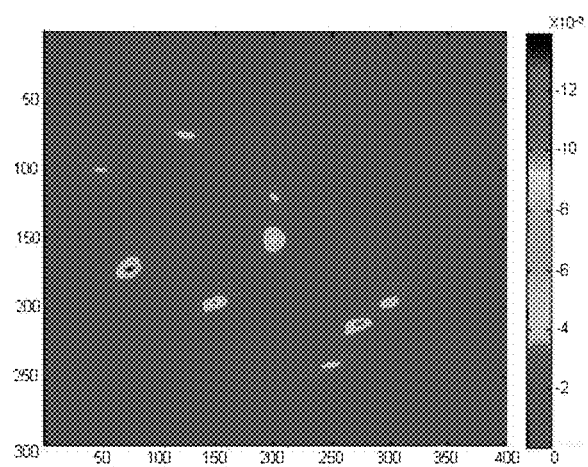
FIG. 18 comprises a displayed image of the objects in the SOI of FIG. 16, in this case using image data processed according to an LMM algorithm.
Figure 19:
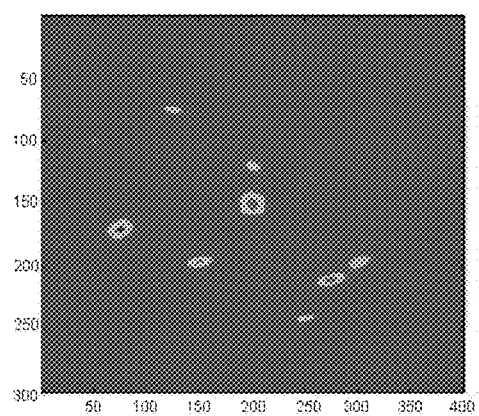
FIG. 19 comprises a displayed image of the objects in the SOI of FIG. 16, in this case using image data processed according to an MAP algorithm using a Jeffreys' prior as configured in accordance with various embodiments of the invention.
Figure 20:
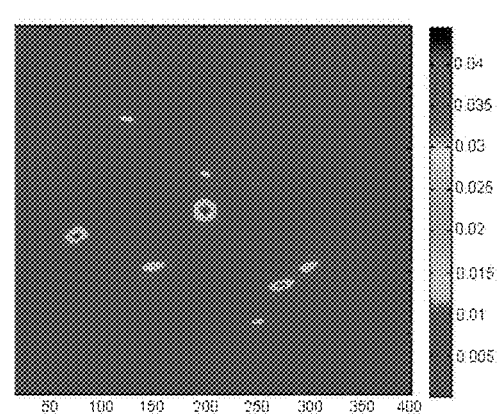
FIG. 20 comprises a displayed image of the objects in the SOI of FIG. 16, in this case using image data processed according to an MAP algorithm using a Laplacian-like prior as configured in accordance with various embodiments of the invention.
Figure 21:
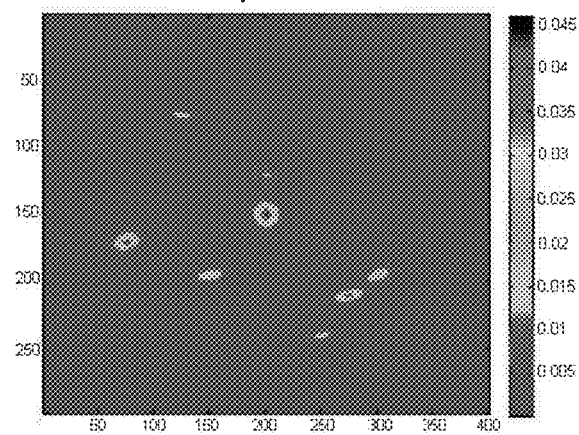
FIG. 21 comprises a displayed image of the objects in the SOI of FIG. 16, in this case using image data processed according to an MAP algorithm using a Laplacian prior as configured in accordance with various embodiments of the invention.

FIG. 16 shows the image obtained using the DAS algorithm. The image has significant side-lobes and shadows, and the background noise is clearly visible. The RSM image in FIG. 17 is an improvement over the DAS image but there is room for improvement. By contrast, the images generated by the $l_1$-regularized least squares algorithm (FIG. 18) and GMR algorithms (see FIGS. 19-21) are sparser and adequately suppresses the side-lobes and background noise. However, unlike the LMM algorithm, the GMR algorithms are user independent because the noise variance and prior parameter are estimated from the observed GPR data.

We also similarly evaluated the performance of the MAP-Butterworth algorithm using both synthetic and real GPR datasets provided by ARL. The MAP-Butterworth algorithm is compared to the DAS, RSM, and LMM algorithms.

Figure 22:
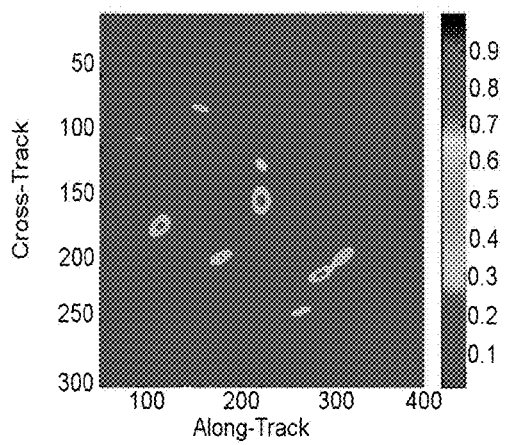
FIG. 22 comprises a displayed image derived from a set of simulated data using a prior art DAS method.
Figure 23:
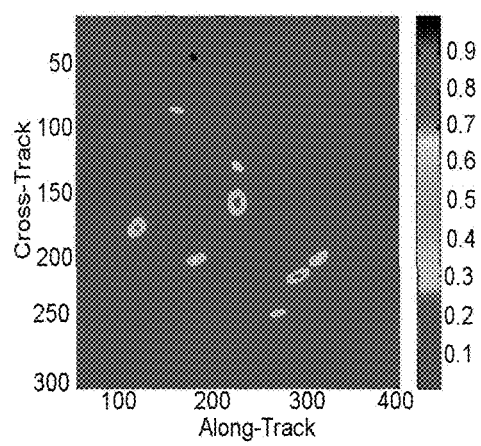
FIG. 23 comprises a displayed image of the objects in the SOI of FIG. 22, in this case using image data processed according to prior art RSM algorithm.
Figure 24:
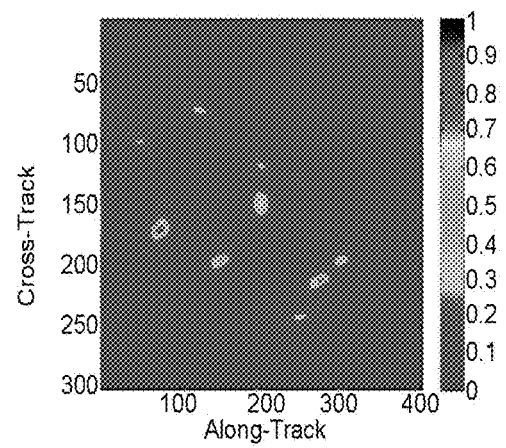
FIG. 24 comprises a displayed image of the objects in the SOI of FIG. 22, in this case using image data processed according to an LMM algorithm.
Figure 25:
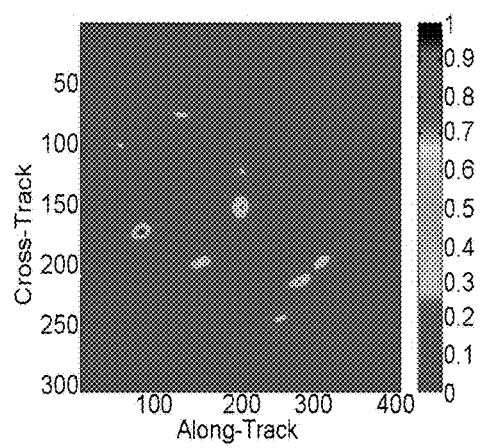
FIG. 25 comprises a displayed image of the objects in the SOI of FIG. 22, in this case using image data processed according to an MAP algorithm using a Butterworth prior as configured in accordance with various embodiments of the invention.

We applied the DAS, RSM, LMM and MAP-Butterworth algorithms to the simulated data. In FIG. 22, we observe that the standard DAS algorithm is not able to satisfactorily remove the noise and sidelobes. In FIG. 23, we observe that the RSM algorithm improves upon the DAS algorithm's results but substantial noise and sidelobes are still present in the image it generated. In contrast, as seen in FIG. 24 and FIG. 25, both the LMM and MAP-Butterworth algorithms retain all the scatterers while significantly suppressing the sidelobes and noise. We observe that the scatterers in the MAP-Butterworth-image are slightly more sparse than in the LMM-image. This may be attributed to the fact in the MAP-Butterworth all parameters are optimally estimated whereas the regularization parameter λ in the LMM algorithm was user-selected using a trial-and-error approach.

We now evaluate the performance of the MAP-Butterworth algorithm using data obtained from ARL's FLGPR system. The test data corresponds to measurements taken from I=274 consecutive transmit locations using J=16 receive antennas. We choose a 65×25 m² SOI and divide it into a grid of 250 voxels in the cross-range direction and 3200 voxels in the down-range direction. As with the simulated data, the cross-range and down-range voxel sizes are 0.1 m and 0.02 m, respectively.

Due to the large size of the SOI, an image is not generated by estimating the reflection coefficients of the voxels all at once. Such an image would have cross-range resolution that varies from the near-range to the far-range voxels. The voxels in the near-range would have higher resolution than those in the far-range. To create GPR images with consistent resolution across the SOI, we use the mosaicing approach discussed in reference to FIG. 4 above. The radar-return data and GPS positioning measurements associated with each sub-aperture are used to estimate the reflection coefficients for the corresponding sub-image. The reconstructed sub-images are merged together to obtain the complete image of the SOI. It should be noted that there is a system matrix for each pair of sub-apertures and sub-SOI. In this sense the model for real GPR data is time-varying.

FIGS. 26-29 show the GPR images that were generated using the DAS, RSM and LMM and MAP-Butterworth algorithms, respectively. It is evident from these figures that the DAS image has significant side lobes and shadows, with clearly visible background noise. Although, side lobes and shadows are reduced in the RSM image, there is still room for improvement. The images obtained using the LMM and MAP-Butterworth algorithms, shown respectively in FIGS. 28 and 29, are sparser than the DAS and RSM images, and adequately suppress both the side lobes and background noise. These results show that the MAP-Butterworth algorithm gives results comparable to those of popular $l_1$-LS algorithms without the usual challenges of finding the most suitable regularization parameter.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The invention claimed is:

1. A method of creating an image from received data by estimating unknown reflection coefficients for individual voxels in a scene of interest (SOI), the method comprising:
receiving the data;
processing the data with a processing device by iteratively deriving an estimated image value for individual voxels in the image through application of a majorize-minimize technique to minimize a maximum a posteriori (MAP) objective function applied to the data, wherein the MAP objective function includes:
  a data component including at least a portion of the data, and
  a prior probability density function for the unknown reflection coefficients configured to apply a restriction that a majority of the reflection coefficients are equal to zero or substantially equal to zero;
displaying the image using the estimated image value of individual voxels of the scene of interest.

2. The method of claim 1 wherein the receiving the data comprises receiving data including information representing 1) transmission site locations of radar return signals, 2) reception site locations of reception of reflections from the radar pulses, 3) radar-return profiles for pairings of the transmission site locations and the reception site locations, and 4) data samples associated with individual radar-return profiles.

3. The method of claim 1 wherein the data component of the MAP objective function is $$\frac{1}{2\sigma^2}\phi_1(x) + \frac{K}{2}\log\sigma^2$$

where $\sigma^2$ is variance of noise in the data and where $\varphi_1(x) \triangleq \|y - Ax\|_2^2$;
where y is the data, A is a K×L system matrix associated with the data, K=IJL where I is a number of transmission site locations, J is a number of reception sites for each transmit site location, L is a number of pixels in the image, and x is a vector representing the reflection coefficients for the scene of interest.

4. The method of claim 3 wherein the prior probability density function for the unknown reflection coefficients is $$\sum_{l=1}^{L} s(x_l, \lambda)$$

where $x_l$ is the estimated image value at an $l^{th}$ voxel, and $$s(x_l, \lambda) \triangleq -\log\frac{\frac{\lambda}{\log 4}}{1 + \exp(\lambda|x_l|)}$$

where λ is a constant controlling a degree of application of the restriction that the majority of the reflection coefficients are small.

5. The method of claim 4 wherein the iteratively deriving the estimated image value comprises iteratively deriving the reflection coefficient for a given voxel using
for l=1,2, . . . , L $$x_l^{(m+1)} = \frac{H_l \cdot x_l^{(m)} + G_l^{(m)}}{H_l + \frac{\sigma^{2(m)} s'(x_l^{(m)}, \lambda^{(m)})}{x_l^{(m)}}}$$

where $$H_l = \sum_{k=1}^{K} r_k A_{kl}^2$$

$$G_l^{(m)} = \sum_{k=1}^{K} A_{kl}(y_k - [Ax^{(m)}]_k)$$

where $r_k$ is the number of non-zero elements in a $k^{th}$ row of a matrix A, $x_l^{(m+1)}$ is the estimated image value at an $l^{th}$ voxel for iterate number (m+1), $x_l^{(m)}$ is the estimated image value at an $l^{th}$ voxel for iterate number (m), $\sigma^{2^{(m)}}$ is an estimation of variance of noise in the data, and $$s'(a, \lambda) = \frac{\lambda a \exp(\lambda|a|)}{|a|[1 + \exp(\lambda|a|)]}$$

where $\lambda$ is a constant controlling a degree of application of the restriction that the majority of the reflection coefficients are small.

6. The method of claim 5 wherein $$\sigma^{2(m)} = \frac{\|y - Ax^{(m)}\|_2^2}{K}$$

is used as an estimate for the variance $\sigma^2$ of the noise in the data for iterate number (m) and $$\hat{\lambda}^{(m)} = \arg\min_{\lambda} \phi(x^{(m)}, \sigma^{2(m)}, \lambda)$$

as solved using a 1D line search, and where $\varphi$ is the MAP objection function, is used as an estimate for the constant controlling the degree of application of the restriction that the majority of the reflection coefficients are small, and where $x^{(m)} \triangleq [x_1^{(m)}, x_2^{(m)}, \ldots, x_l^{(m)}]$.

7. The method of claim 3 wherein a negative log of a summation of the prior probability density function for the unknown reflection coefficients is $$\sum_{l=1}^{L} s(x_l, \theta)$$

where $x_l$ is the estimated image value at an $l^{th}$ voxel, and $$s(a) \triangleq -\log \frac{1}{|a|}.$$

8. The method of claim 7 wherein the iteratively deriving the estimated image value comprises iteratively deriving the reflection coefficient for a given voxel using
for l=1,2, ..., L $$x_l^{(m+1)} = \frac{G_l^{(m)} + x_l^{(m)} H_l}{H_l + \sigma^{2(m)} \frac{1}{(x_l^{(m)})^2}}$$

where $$H_l = \sum_{k=1}^{K} r_k A_{kl}^2$$

$$G_l^{(m)} = \sum_{k=1}^{K} A_{kl}(y_k - [Ax^{(m)}]_k)$$

where $x_l^{(m+1)}$ is the estimated image value at an $l^{th}$ voxel for iterate number (m+1), $x_l^{(m)}$ is the estimated image value at an $l^{th}$ voxel for iterate number (m), $\sigma^{2^{(m)}}$ is an estimation of variance of noise in the data, and $$\frac{s'(a)}{a} = \frac{1}{a^2}.$$

9. The method of claim 8 wherein $$\sigma^{2(m+1)} = \frac{\|y - Ax^{(m+1)}\|_2^2}{K}$$

is used as an estimate for the variance $\sigma^2$ of the noise in the data for iterate number (m+1) and $$\lambda^{(m+1)} = \arg\min_{\lambda} \phi(x^{(m+1)}, \lambda, \sigma^{2(m)})$$

as solved using a 1D line search, and where $\varphi$ is the MAP objection function, is used as an estimate for the constant controlling the degree of application of the restriction that the majority of the reflection coefficients are small, and where $x^{(m)} \triangleq [x_1^{(m)}, x_2^{(m)}, \ldots, x_l^{(m)}]$.

10. The method of claim 3 wherein the prior probability density function for the unknown reflection coefficients is a function with an approximately uniform peak across a width, wherein beyond the width the function decays to zero.

11. The method of claim 10 wherein the function is defined as $$f(a; \epsilon) \triangleq \frac{k_n(\epsilon)}{1 + \left(\frac{a}{\epsilon}\right)^{2n}}$$

where $\epsilon$ and n are parameters that control width and decay rate for this prior probability density function and where $$k_n(\epsilon) \triangleq \left[ \int_{-\infty}^{\infty} \frac{1}{1+\left(\frac{a}{\epsilon}\right)^{2n}} da \right]^{-1}.$$

12. The method of claim 11 wherein the iteratively deriving the estimated image value comprises iteratively deriving the reflection coefficient for a given voxel using f or l=1,2, . . . , L $$x_l^{(m+1)} = x_l^{(m)} + \frac{G_l^{(m)} - \sigma^{2(m)} \cdot g'(x_l^{(m)}; \epsilon)}{\sigma^{2(m)} \cdot B + H_l}$$

where $x_l^{(m+1)}$ is the estimated image value at an $l^{th}$ voxel for iterate number (m+1), $x_l^{(m)}$ is the estimated image value at an $l^{th}$ voxel for iterate number (m), $\sigma^{2(m)}$ is the estimate of the variance of noise in the data at the iterate number (m), B is least upper bound of the second derivative of $$g(a; \epsilon) = -\log \frac{k_n(\epsilon)}{1+\left(\frac{a}{\epsilon}\right)^{2n}}$$

where $\in$ and n are parameters that control width and decay rate for the prior probability density function and where $$k_n(\epsilon) \triangleq \left[ \int_{-\infty}^{\infty} \frac{1}{1+\left(\frac{a}{\epsilon}\right)^{2n}} da \right]^{-1}$$

and where $$g'(a; \epsilon) = \frac{2n\left(\frac{a}{\epsilon}\right)^{2n-1}}{\epsilon\left(1+\left(\frac{a}{\epsilon}\right)^{2n}\right)}$$

and where $$H_l = \sum_{k=1}^{K} r_k A_{kl}^2$$

$$G_l^{(m)} = \sum_{k=1}^{K} A_{kl}(y_k - [Ax^{(m)}]_k).$$

13. The method of claim 12 wherein the variance of the noise in the data is estimated using a maximum likelihood estimate of noise power.

14. The method of claim 13 wherein the maximum likelihood estimate of noise power for iterate number (m) is given by $$\sigma^{2(m)} = \frac{1}{K}\|y - Ax^{(m)}\|_2^2$$

15. The method of claim 1 wherein the calculating the terms comprises:

computing $G_l^{(m)}$ by applying a hash-table-based computation to $$q_{ij}[k] = \sum_{l \in S_k} d_{ijl}^{(m)}$$

where $d_{ijl}^{(m)} = a_{ijl}x_l^{(m)}$ and $S_k = \{l=1,2, \ldots, L: n_{ijl}=k\}$ and $a_{ijl}$ represents attenuation of the given radar pulse during travel from an $i^{th}$ transmit location to an $l^{th}$ voxel and back to a $j^{th}$ receiver.

16. The method of claim 15 further comprising computing $G_l^{(m)}$ via i=1,2, . . . , I; j=1,2, . . . , J; l=1,2, . . . , L $$G_l^{(m)} = \sum_{i=1}^{I} \sum_{j=1}^{J} \alpha_{ijl} G_{ijl}^{(m)}$$

where $$G_{ijl}^{(m)} = \{(w * (y_{ij} - s_{ij}^{(m)}))[k]\}|_{k=n_{ijl}}$$

$$s_{ij}^{(m)}[n] = (q_{ij} * w)[n]$$

and where $y_{ij}[k]$ is a $k^{th}$ sample of a radar-return profile associated with an $i^{th}$ transmit location and $j^{th}$ receiver, $s_{ij}^{(m)}[k]$ is the $m^{th}$ estimate of a noise-free component of $y_{ij}[k]$, w is a discretized version of the given radar pulse, and $n_{ijl}$ is a discrete time-delay corresponding to rounding the quotient of the time taken by the given radar pulse to travel from a transmitter at the $i^{th}$ transmit location to the $l^{th}$ voxel and back to the $j^{th}$ receiver and a sampling interval, and * denotes discrete-time convolution.

17. The method of claim 12 wherein the calculating of the terms comprises:

computing $H_l$ by applying a hash-table-based computation to $$|S_k|$$

where $|S_k|$ denotes a number of elements in the set $S_k$.

18. The method of claim 17 wherein the computing $H_l$ further comprises computing $H_l$ via i=1,2, . . . ,I;j=1,2, . . . ,J;l=1,2, . . . ,L $$H_l = \sum_{i=1}^{I} \sum_{j=1}^{J} \alpha_{ijl}^2 H_{ijl}$$

where $$H_{ijl} = (\gamma_{ij} * h)[k]|_{k=n_{ijl}},$$

$$\gamma_{ij}[n] = v(\min(n+M, N)) - v(\max(0, n-M))),$$

$$v(m) = \sum_{k=0}^{m} |S_k|$$

and where h is a discretized version of a squared radar pulse and 2M+1 is a number of non-zero samples in the given radar pulse.

19. The method of claim 1 further comprising:
emitting a radar pulse at specified intervals into a scene of interest;
detecting amplitudes of signal reflections from the scene of interest from the radar pulse;

recording position data corresponding to individual radar pulse emissions and individual receptions of the signal reflections; and creating the initial data set from the position data and detected amplitudes of the signal reflections.

20. An apparatus for detecting objects in a scene of interest, the apparatus comprising:
a vehicle;
a plurality of radar transmission devices mounted on the vehicle and configured to transmit radar pulses into a scene of interest; a plurality of radar reception devices mounted on the vehicle, individual ones of the plurality of radar reception devices being configured to detect amplitudes of signal reflections received from the scene of interest from the radar pulses;
a location determination device configured to detect a location of the vehicle at a time of transmission of the radar pulse from the plurality of radar transmission devices and reception of the signal reflections by the radar reception devices;
a processing device configured to process a data set including information representing 1) transmission site locations of individual ones of the radar pulses, 2) reception site locations of reception of individual ones of the signal reflections, and 3) a number of data samples per reception profile by: iteratively deriving an estimated image value for each voxel in the image through application of a majorize-minimize technique to minimize a maximum a posteriori (MAP) objective function applied to the data wherein the MAP objective function includes:
a data component including at least a portion of the data, and
a prior probability density function for the unknown reflection coefficients to apply an assumption that a majority of the reflection coefficients are equal to zero or substantially equal to zero.

21. The apparatus of claim 20 wherein the processing device is further configured to calculate the data component of the MAP objective function as $$\frac{1}{2\sigma^2}\phi_1(x) + \frac{K}{2}\log\sigma^2$$

where $\sigma^2$ is variance of noise in the data and where $\varphi_1(x) \triangleq \|y-Ax\|_2^2$;

where y is the data, A is a K×L system matrix associated with the data, K=IJL where I is a number of transmission site locations, J is a number of reception sites for each transmit site location, L is a number of pixels in the image, and x is a vector representing the reflection coefficients for the scene of interest.

22. The apparatus of claim 21 wherein the processing device is further configured to use the prior probability density function for the unknown reflection coefficients defined as $$\sum_{l=1}^{L} s(x_l, \lambda)$$

where $x_l$ is the estimated image value at an $l^{th}$ voxel, and $$s(x_l) \triangleq -\log\frac{\frac{\lambda}{\log 4}}{1 + \exp(\lambda|x_l|)}$$

where $\lambda$ is a constant controlling a degree of application of the restriction that the majority of the reflection coefficients are small.

23. The apparatus of claim 22 wherein the processing device is further configured to iteratively derive the reflection coefficient for a given voxel using
for l=1,2, . . . , L $$x_l^{(m+1)} = \frac{H_l \cdot x_l^{(m)} + G_l^{(m)}}{H_l + \frac{\sigma^{2(m)} s'(x_l^{(m)}, \lambda^{(m)})}{x_l^{(m)}}}$$

where $$H_l = \sum_{k=1}^{K} r_k A_{kl}^2$$

$$G_l^{(m)} = \sum_{k=1}^{K} A_{kl}(y_k - [Ax^{(m)}]_k)$$

where $r_k$ is the number of non-zero elements in a $k^{th}$ row of a matrix A, $x_l^{(m+1)}$ is the estimated image value at an $l^{th}$ voxel for iterate number (m+1), $x_l^{(m)}$ is the estimated image value at an $l^{th}$ voxel for iterate number (m), $\sigma^2$ is variance of noise in the data, and $$s'(a, \lambda) = \frac{\lambda a \exp(\lambda|a|)}{|a|[1 + \exp(\lambda|a|)]}$$

where $\lambda$ is a constant controlling a degree of application of the restriction that the majority of the reflection coefficients are small.

24. The apparatus of claim 23 wherein $$\sigma^{2(m)} = \frac{\|y - Ax^{(m)}\|_2^2}{K}$$

is used as an estimate for the variance $\sigma^2$ of the noise in the data and $$\hat{\lambda}^{(m)} = \underset{\lambda}{\operatorname{argmin}}\, \phi(x^{(m)}, \sigma^{2(m)}, \lambda)$$

as solved using a 1D line search, and where φ is the MAP objection function, is used as an estimate for the constant controlling the degree of application of the restriction that the majority of the reflection coefficients are small, and where $x^{(m)} \triangleq [x_1^{(m)}, x_2^{(m)}, \ldots, x_l^{(m)}]$.

25. The apparatus of claim 21 wherein the processing device is further configured to use a negative log of a summation of the prior probability density function for the unknown reflection coefficients as $$\sum_{l=1}^{L} s(x_l, \theta)$$

where $x_l$ is the estimated image value at an $l^{th}$ voxel, and $$s(a) \triangleq -\log\frac{1}{|a|}.$$

26. The apparatus of claim 25 wherein the processing device is further configured to iteratively derive the reflection coefficient for a given voxel using
for l=1,2, ... , L $$x_l^{(m+1)} = \frac{G_l^{(m)} + x_l^{(m)} H_l}{H_l + \sigma^{2(m)} \frac{1}{(x_l^{(m)})^2}}$$

where $$H_l = \sum_{k=1}^{K} r_k A_{kl}^2$$

$$G_l^{(m)} = \sum_{k=1}^{K} A_{kl}(y_k - [Ax^{(m)}]_k)$$

where $x_l^{(m+1)}$ is the estimated image value at an $l^{th}$ voxel for iterate number (m+1), $x_l^{(m)}$ is the estimated image value at an $l^{th}$ voxel for iterate number (m), $\sigma^{2(m)}$ is an estimation of variance of noise in the data, and $$\frac{s'(a)}{a} = \frac{1}{a^2}.$$

27. The apparatus of claim 26 wherein $$\sigma^{2(m+1)} = \frac{\|y - Ax^{(m+1)}\|_2^2}{K}$$

is used as an estimate for the variance $\sigma^2$ of the noise in the data for iterate number (m+1) and $$\lambda^{(m+1)} = \underset{\lambda}{\arg\min}\, \phi(x^{(m+1)}, \lambda, \sigma^{2(m)})$$

as solved using a 1D line search, and where φ is the MAP objection function, is used as an estimate for the constant controlling the degree of application of the restriction that the majority of the reflection coefficients are small, and where $x^{(m)} \triangleq [x_1^{(m)}, x_2^{(m)}, \ldots, x_l^{(m)}]$.

28. The apparatus of claim 21 wherein the prior probability density function for the unknown reflection coefficients is a function with an approximately uniform peak across a width, wherein beyond the width the function decays to zero.

29. The apparatus of claim 28 wherein the function is defined as $$f(a; \epsilon) \triangleq \frac{k_n(\epsilon)}{1 + \left(\frac{a}{\epsilon}\right)^{2n}}$$

where $\in$ and n are parameters that control width and decay rate and where $$k_n(\epsilon) \triangleq \left[\int_{-\infty}^{\infty} \frac{1}{1 + \left(\frac{a}{\epsilon}\right)^{2n}} da\right]^{-1}.$$

30. The apparatus of claim 29 wherein the processing device is further configured to iteratively derive the estimated image value comprises iteratively deriving the reflection coefficient for a given voxel using
for l=1,2, ... , L $$x_l^{(m+1)} = x_l^{(m)} + \frac{G_l^{(m)} - \sigma^{2(m)} \cdot g'(x_l^{(m)}; \epsilon)}{\sigma^{2(m)} \cdot B + H_l}$$

where $x_l^{(m+1)}$ is the estimated image value at an $l^{th}$ voxel for iterate number (m+1), $x_l^{(m)}$ is the estimated image value at an $l^{th}$ voxel for iterate number (m), $\sigma^{2(m)}$ is the estimate of the variance of noise in the data at the iterate number (m), B is least upper bound of the second derivative of $$g(a; \epsilon) = -\log\frac{k_n(\epsilon)}{1 + \left(\frac{a}{\epsilon}\right)^{2n}}$$

where $\in$ and n are parameters that control width and decay rate for the prior probability density function and where $$k_n(\epsilon) \triangleq \left[\int_{-\infty}^{\infty} \frac{1}{1 + \left(\frac{a}{\epsilon}\right)^{2n}} da\right]^{-1}$$

and where $$g'(a; \epsilon) = \frac{2n\left(\frac{a}{\epsilon}\right)^{2n-1}}{\epsilon\left(1 + \left(\frac{a}{\epsilon}\right)^{2n}\right)}$$

and where $$H_l = \sum_{k=1}^{K} r_k A_{kl}^2$$

$$G_l^{(m)} = \sum_{k=1}^{K} A_{kl}(y_k - [Ax^{(m)}]_k).$$

31. The apparatus of claim 30 wherein the variance of the noise in the data is estimated using a maximum likelihood estimate of noise power.

32. The apparatus of claim 31 wherein the maximum likelihood estimate of noise power for the iterate number (m) is given by $$\sigma^{2(m)} = \frac{1}{K}\|y - Ax^{(m)}\|_2^2$$

where $x^{(m)} \triangleq [x_1^{(m)}, x_2^{(m)}, \ldots, x_l^{(m)}]$.

33. The apparatus of claim 20 wherein the processing device is configured to calculate the terms by:

computing $G_l^{(m)}$ by applying a hash-table-based computation to $$q_{i,j}[k] = \sum_{l \in S_k} d_{ijl}^{(m)}$$

where $d_{ijl}^{(m)} = \alpha_{ijl} x_l^{(m)}$ and $S_k = \{l=1, 2, \ldots, L: n_{ijl} = k\}$ and $a_{ijl}$ represents attenuation of the given radar pulse during travel from an $i^{th}$ transmit location to an $l^{th}$ voxel and back to a $j^{th}$ receiver.

34. The apparatus of claim 33 wherein the processing device is further configured to compute $G_l^{(m)}$ via i=1, 2, . . . , I; j=1, 2, . . . , J; l=1, 2, . . . , L $$G_l^{(m)} = \sum_{i=1}^{I} \sum_{j=1}^{J} \alpha_{ijl} G_{ijl}^{(m)}$$

where $$G_{ijl}^{(m)} = \{[w * (y_{ij} - s_{ij}^{(m)}))[k]\}|_{k=n_{ijl}}$$

$$s_{ij}^{(m)}[n] = (q_{ij} * w)[n]$$

and where $y_{ij}[k]$ is a $k^{th}$ sample of a radar-return profile associated with an $i^{th}$ transmit location and $j^{th}$ receiver, $s_{ij}^{(m)}[k]$ is the $m^{th}$ estimate of a noise-free component of $y_{ij}[k]$, w is a discretized version of the given radar pulse, and $n_{ijl}$ is a discrete time-delay corresponding to rounding the quotient of the time taken by the given radar pulse to travel from a transmitter at the $i^{th}$ transmit location to the $l^{th}$ voxel and back to the $j^{th}$ receiver and a sampling interval, and * denotes discrete-time convolution.

35. The apparatus of claim 20 wherein processing device is configured to calculate the terms by:

computing $H_l$ by applying a hash-table-based computation to $|S_k|$ where $|S_k|$ denotes a number of elements in the set $S_k$.

36. The apparatus of claim 35 wherein the processing device is configured to compute $H_l$ via i=1, 2, . . . , I; j=1, 2, . . . , J; l=1, 2, . . . , L $$H_l = \sum_{i=1}^{I} \sum_{j=1}^{J} \alpha_{ijl}^2 H_{ijl}$$

where $$H_{ijl} = (\gamma_{ij} * h)[k]|_{k=n_{ijl}},$$

$$\gamma_{ij}[n] = v(\min(n+M, N)) - v(\max(0, n-M))),$$

$$v(m) = \sum_{k=0}^{m} |S_k|$$

and where h is a discretized version of a squared radar pulse and 2M+1 is a number of non-zero samples in the given radar pulse.

37. The method of claim 3 wherein the prior probability density function for the unknown reflection coefficients is $$\sum_{l=1}^{L} s(x_l, \theta)$$

where $x_l$ is the estimated image value at an $l^{th}$ voxel, and $$s(a; \lambda) \triangleq -\log\frac{\frac{\lambda}{\log 4}}{1 + \exp(\lambda|a|)}.$$

38. The method of claim 37 wherein the iteratively deriving the estimated image value comprises iteratively deriving the reflection coefficient for a given voxel using for l=1,2, . . . , L $$x_l^{(m+1)} = \frac{G_l^{(m)} + x_l^{(m)} H_l}{H_l + \sigma^2 \frac{\lambda \exp(\lambda|x_l^{(m)}|)}{|x_l^{(m)}|(1 + \exp(\lambda|x_l^{(m)}|))}}$$

where $$H_l = \sum_{k=1}^{K} r_k A_{kl}^2$$

$$G_l^{(m)} = \sum_{k=1}^{K} A_{kl}(y_k - [Ax^{(m)}]_k)$$

where $x_l^{(m+1)}$ is the estimated image value at an $l^{th}$ voxel for iterate number (m+1), $x_l^{(m)}$ is the estimated image value at an $l^{th}$ voxel for iterate number (m), $\sigma^{2(m)}$ is an estimation of variance of noise in the data, and $$\frac{s'(a; \lambda)}{a} = \frac{\lambda \exp(\lambda|a|)}{|a|(1 + \exp(\lambda|a|))}.$$

39. The method of claim 3 wherein a negative log of a summation of the prior probability density function for the unknown reflection coefficients is $$\sum_{l=1}^{L} s(x_l, \theta)$$

where $x_l$ is the estimated image value at an $l^{th}$ voxel, and $$s(a; \lambda) \overset{\Delta}{=} -\log \frac{\lambda}{2} \exp(-\lambda|a|).$$

40. The method of claim 39 wherein the iteratively deriving the estimated image value comprises iteratively deriving the reflection coefficient for a given voxel using for l=1,2, ... , L $$x_l^{(m+1)} = \frac{G_l^{(m)} + x_l^{(m)} H_l}{H_l + \sigma^2 \frac{\lambda}{|x_l^{(m)}|}}$$

where $$H_l = \sum_{k=1}^{K} r_k A_{kl}^2$$

$$G_l^{(m)} = \sum_{k=1}^{K} A_{kl}(y_k - [Ax^{(m)}]_k)$$

where $x_l^{(m+1)}$ is the estimated image value at an $l^{th}$ voxel for iterate number (m+1), $x_l^{(m)}$ is the estimated image value at an $l^{th}$ voxel for iterate number (m), $\sigma^{2^{(m)}}$ is an estimation of variance of noise in the data, and $$\frac{s'(a; \lambda)}{a} = \frac{\lambda}{|a|}.$$

41. The apparatus of claim 21 wherein the processing device is further configured to use a negative log of a summation of the prior probability density function for the unknown reflection coefficients as $$\sum_{l=1}^{L} s(x_l, \theta)$$

where $x_l$ is the estimated image value at an $l^{th}$ voxel, and $$s(a; \lambda) \overset{\Delta}{=} -\log \frac{\frac{\lambda}{\log 4}}{1 + \exp(\lambda|a|)}.$$

42. The apparatus of claim 41 wherein the processing device is further configured to iteratively derive the reflection coefficient for a given voxel using for l=1, 2, ... , L $$x_l^{(m+1)} = \frac{G_l^{(m)} + x_l^{(m)} H_l}{H_l + \sigma^2 \frac{\lambda \exp(\lambda|x_l^{(m)}|)}{|x_l^{(m)}|(1 + \exp(\lambda|x_l^{(m)}|))}}$$

where $$H_l = \sum_{k=1}^{K} r_k A_{kl}^2$$

$$G_l^{(m)} = \sum_{k=1}^{K} A_{kl}(y_k - [Ax^{(m)}]_k)$$

where $x_l^{(m+1)}$ is the estimated image value at an $l^{th}$ voxel for iterate number (m+1), $x_l^{(m)}$ is the estimated image value at an $l^{th}$ voxel for iterate number (m), $\sigma^{2^{(m)}}$ is an estimation of variance of noise in the data, and $$\frac{s'(a; \lambda)}{a} = \frac{\lambda \exp(\lambda|a|)}{|a|(1 + \exp(\lambda|a|))}.$$

43. The apparatus of claim 21 wherein the processing device is further configured to use a negative log of a summation of the prior probability density function for the unknown reflection coefficients as $$\sum_{l=1}^{L} s(x_l, \theta)$$

where $x_l$ is the estimated image value at an $l^{th}$ voxel, and $$s(a; \lambda) \overset{\Delta}{=} -\log \frac{\lambda}{2} \exp(-\lambda|a|).$$

44. The apparatus of claim 43 wherein the processing device is further configured to iteratively derive the reflection coefficient for a given voxel using for l=1, 2, ... , L $$x_l^{(m+1)} = \frac{G_l^{(m)} + x_l^{(m)} H_l}{H_l + \sigma^2 \frac{\lambda}{|x_l^{(m)}|}}$$

where $$H_l = \sum_{k=1}^{K} r_k A_{kl}^2$$

$$G_l^{(m)} = \sum_{k=1}^{K} A_{kl}(y_k - [Ax^{(m)}]_k)$$

where $x_l^{(m+1)}$ is the estimated image value at an $l^{th}$ voxel for iterate number (m+1), $x_l^{(m)}$ is the estimated image value at an $l^{th}$ voxel for iterate number (m), $\sigma^{2(m)}$ is an estimation of variance of noise in the data, and $$\frac{s'(a;\lambda)}{a} = \frac{\lambda}{|a|}.$$

* * * * *